(12) United States Patent
Mayes et al.

(10) Patent No.: US 11,370,894 B2
(45) Date of Patent: Jun. 28, 2022

(54) COMPOSITE PRODUCT AND A PROCESS FOR PRODUCING SAID PRODUCT

(71) Applicants: Stora Enso OYJ, Helsinki (FI); University of Maine System Board of Trustees, Bangor, ME (US)

(72) Inventors: Duncan Mayes, Helsinki (FI); Janne Pynnonen, Lempaala (FI); Christopher H West, Detroit, ME (US); Douglas J Gardner, Brewer, ME (US); Yousoo Han, Bangor, ME (US)

(73) Assignees: Stora Enso OYJ, Helsinki (FI); University of Maine System Board of Trustees, Bangor, ME (US)

( * ) Notice: Subject to any disclaimer, the term of this patent is extended or adjusted under 35 U.S.C. 154(b) by 68 days.

(21) Appl. No.: 15/760,120

(22) PCT Filed: Sep. 20, 2016

(86) PCT No.: PCT/IB2016/055604
§ 371 (c)(1),
(2) Date: Mar. 14, 2018

(87) PCT Pub. No.: WO2017/051310
PCT Pub. Date: Mar. 30, 2017

(65) Prior Publication Data
US 2018/0265665 A1 Sep. 20, 2018

Related U.S. Application Data

(60) Provisional application No. 62/221,238, filed on Sep. 21, 2015.

(51) Int. Cl.
| | |
|---|---|
| *C08J 9/34* | (2006.01) |
| *C08J 9/00* | (2006.01) |
| *B32B 5/14* | (2006.01) |
| *C08J 5/06* | (2006.01) |
| *C08J 5/04* | (2006.01) |
| *B29B 7/90* | (2006.01) |
| *B29B 9/14* | (2006.01) |
| *B29C 44/34* | (2006.01) |
| *B29C 44/44* | (2006.01) |
| *B29K 25/00* | (2006.01) |
| *B29K 401/00* | (2006.01) |

(52) U.S. Cl.
CPC .................... *C08J 9/34* (2013.01); *B29B 7/90* (2013.01); *B29B 9/14* (2013.01); *B29C 44/3415* (2013.01); *B29C 44/445* (2013.01); *B32B 5/14* (2013.01); *C08J 5/045* (2013.01); *C08J 5/06* (2013.01); *C08J 9/0061* (2013.01); *C08J 9/0066* (2013.01); *C08J 9/0076* (2013.01); *C08J 9/0085* (2013.01); *B29K 2025/08* (2013.01); *B29K 2401/00* (2013.01); *C08J 2201/03* (2013.01); *C08J 2205/00* (2013.01); *C08J 2325/08* (2013.01); *C08J 2325/18* (2013.01); *C08J 2335/06* (2013.01); *C08J 2401/02* (2013.01)

(58) Field of Classification Search
CPC ....... C08J 9/34; C08J 5/045; C08J 5/06; C08J 9/0076; C08J 9/0085; C08J 9/0061; C08J 9/0066; C08J 2201/03; C08J 2205/00; C08J 2325/08; C08J 2401/02; C08K 7/02; C08I 97/02; D21C 9/007; B29B 7/90; B29B 9/14; B29C 44/3415; B29C 44/445; B32B 5/14; B29K 2025/08
See application file for complete search history.

(56) References Cited

U.S. PATENT DOCUMENTS

| | | | | |
|---|---|---|---|---|
| 2,328,749 | A * | 9/1943 | Sherrard | C08H 6/00 162/16 |
| 3,765,934 | A | 10/1973 | Gaylord | |
| 6,083,601 | A * | 7/2000 | Prince | B27N 3/28 428/71 |
| 2002/0165289 | A1* | 11/2002 | Park | B29C 48/39 521/82 |
| 2009/0181207 | A1* | 7/2009 | Michalik | B29C 44/22 428/71 |

FOREIGN PATENT DOCUMENTS

| | | |
|---|---|---|
| RU | 2418823 C2 | 5/2011 |
| WO | 2007050324 A1 | 5/2007 |

(Continued)

OTHER PUBLICATIONS

Manuel Raul Pelaez-Samaniego; Vikram Yadama; Eini Lowell; Raul Espinoza-Herrera. "A review of wood thermal pretreatments to improve wood composite properties" Wood Sci Technol (2013) 47:1285-1319 (Year: 2013).*

(Continued)

*Primary Examiner* — Michael M Dollinger
*Assistant Examiner* — Christina H. W. Rosebach
(74) *Attorney, Agent, or Firm* — Greer, Burns & Crain, Ltd.

(57) ABSTRACT

The present invention relates to a method of making a foamed cellulosic fiber-thermoplastic composite article. The method includes the steps of providing a copolymer composition, combining the copolymer composition and cellulosic fibers, applying heat, mixing energy and pressure to form a foamable mixture, and forming the foamable article in a molding or extruding operation. The method is characterized in that at least 10% of the cellulosic fibers have been thermally modified prior to being combined with the copolymer composition.

36 Claims, No Drawings

(56) References Cited

FOREIGN PATENT DOCUMENTS

| WO | 2008144333 A1 | 11/2008 |
| WO | 2012035192 A1 | 3/2012 |
| WO | 2015052382 A1 | 4/2015 |

OTHER PUBLICATIONS

R. Mat Taib; Z. A. Mohd Ishak; H. D. Rozman; W. G. Glasser. "Steam-Exploded Wood Fibers as Reinforcement of Polymer Composites" Chapter 20, Handbook of Engineering Biopolymers. pp. 630-633. (Year: 2007).*

G. M. Rizvi, C. B. Park, W. S. Lin, G. Guo, and R. Pop-Iliev. Expansion Mechanisms of Plastic/Wood-Flour Composite Foams With Moisture, Dissolved Gaseous Volatiles, and Undissolved Gas Bubbles. Polymer Engineering and Science, Jul. 2003, vol. 43, No. 7 (Year: 2003).*

International Search Report for PCT/IB2016/055604, dated Nov. 21, 2016.

\* cited by examiner

COMPOSITE PRODUCT AND A PROCESS FOR PRODUCING SAID PRODUCT

This application is a U.S. National Stage under 35 U.S.C. § 371 of International Application No. PCT/IB32016/055604, filed Sep. 20, 2016, which claims priority to U.S. Provisional Patent application No. 62/221,238, filed Sep. 21, 2015.

FIELD OF THE INVENTION

The present invention relates to a method of making a foamed cellulosic fiber-thermoplastic composite article. The method includes the steps of providing a copolymer composition, combining the copolymer composition and cellulosic fibers, applying heat, mixing energy and pressure to form a foamable mixture, and forming the foamable article in a molding or extruding operation. The method is characterized in that at least 10% of the cellulosic fibers have been thermally modified prior to being combined with the copolymer composition.

BACKGROUND

Traditionally, fences, decks, doors, windows, cladding and siding have been made of components fashioned from solid wood. These products are often considered more aesthetically appealing than those made of metal or cement, for example, metal fences or cement block walls or decks. However, after a period of time, solid wood products may naturally begin to break down from weather exposure and biological infestations. It is known that this deterioration can be tempered by treating the wood with widely available weather resistant coatings, paints, varnishes, finishes and the like. Unfortunately, however, it is often only a matter of time before such treated products deteriorates requiring partial or complete replacement. Many solid wood materials that are suitable for fencing, decking, windows and doors are costly. In addition, because of natural variations in wood, replacement of individual components may result in an inconsistent, uneven appearance to the products.

Many products, technologies and ideas have been used to make extruded or molded thermoplastics as an alternative to wood in semi-structural outdoor applications such as decking, park walkways, children's playgrounds, seats and benches. The thermoplastic most widely used is polyethylene, typically a recycled product from HDPE, LDPE & LLDPE milk bottles, film etc. Other thermoplastics widely used include polystyrene, impact modified polystyrene, PVC and polypropylene. Many systems also use cellulosic filler, typically wood or other natural fibers, compounded into the thermoplastic to enhance properties and make the compound look more like the wooden planks it replaces. These systems are rapidly gaining market acceptance, especially in decks where they have advantages of long-term durability and lack of maintenance. They have an additional advantage because of recent health concerns regarding the chemicals and preservatives used to treat wood for outdoor applications and in view of the scarcity of durable hardwood.

Many composites, such as cellulosic/polymer composites are used as replacements for all-natural wood, particleboard, wafer board, and other similar material. For example, U.S. Pat. Nos. 3,908,902; 4,091,153; 4,686,251; 4,708,623; 5,002,713; 5,087,400; 5,151,238; 5,417,904; 5,948,524; 6,280,667; 6,827,995 and 6,936,200 relate to processes for making plastic/cellulose wood replacement products.

Solid composites of styrene-maleic anhydride and wood based fillers are disclosed in U.S. Pat. Nos. 3,765,934; 3,894,975 and 3,958,069; Canadian Published Patent Application No. 2,626,992 A1 and "Properties of Styrene-Maleic Anhydride Copolymers Containing Wood-Based Fillers", Simonsen et al., Forest Products Journal, Vol. 48, No. 1, pp. 89-92, January, 1998.

As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites have the appearance of natural wood, and they may be sawed, sanded, shaped, turned, fastened, and finished in the same manner as natural woods. Consequently, cellulosic/polymer composites are commonly used for applications such as interior and exterior decorative house moldings, picture frames, furniture, porch decks, deck railings, window moldings, window components, door components, roofing structures, building siding, and other suitable indoor and outdoor components. Furthermore, cellulosic/polymer composites may replace highly durable and scarce hardwood, e.g. tropical hardwood.

Those skilled in the art have recognized that excessive moisture content in a synthetic wood composition may result in a poor quality end product. In particular, excessive moisture content in a synthetic wood composition may result in an end component that is susceptible to cracking, blistering, and deteriorating appearance. Consequently, it may be necessary to dry any cellulosic material to a predetermined level prior to introducing it into the synthetic wood composition. Even after the cellulosic material is dried, it has a natural tendency to reabsorb moisture from the environment. As a result, it may also be necessary to store the dried cellulosic material in a moisture controlled environment in order to prevent the cellulosic material from reabsorbing additional moisture before being added to the synthetic wood composition. In light of these considerations, it may be difficult and costly to maintain sufficiently dry cellulosic material while shipping it between different locations.

Plastic fence components have been developed as alternatives or supplements to traditional, natural wood fences. For example, U.S. Pat. No. 5,100,109 describes a method of constructing a fence by providing a flexible, plastic, rollable fence board that can be unrolled and fastened to spaced apart fence posts. The flexible fence board is made with height and width dimensions simulating a standard wooden board and with a length of 350 feet or more. According to this patent, the fence board is formed in a continuous extrusion process of a flexible thermoplastic material.

U.S. Pat. No. 5,404,685 describes a wall or fence made in part of foamed polystyrene plastic components, more specifically, plastic columns and panels. Construction of a fence in accordance with this patent requires multiple steps. For example, wall or fence stability is achieved by pouring a reinforcing filler material, such as concrete, into a hollow of the polystyrene plastic columns after the columns have been secured to the ground. A hardened outer surface of the fence is achieved by applying an exterior finish, such as stucco or special exterior paint, to the fence or wall after the fence has been constructed.

However, the synthetic wood or wood composite products described above, typically have disadvantages when their mechanical properties, especially strength and stiffness are compared with the wood they replace. Further, the wood/cellulosic composites described above are susceptible to creep when subjected to continuous loads and/or high ambient temperatures. Additionally, these materials tend to warp after long term exposure to heat. Because of these structural limitations the use of the synthetic wood products described above is often restricted to less structural applications. For example, in decks they are used for deck boards but typically cannot be used for the vertical posts and joists that bear the loads of the whole structure.

Additionally, many of the synthetic wood products described above have densities greater than water, which makes them unfavorable materials to use in marine and related applications.

For standard wood fiber polymer composites (WPC's), a common problem is creep attributable to both the high weight and thermoplastic nature of the material based on fiber, thermoplastic resins and additives. Creep can be both weight, heat and moisture induced and often limits the use of standard wood fiber polymer composites from being used in more detailed and challenging applications where longer spans are needed and the products are required to carry their own weight such as in a cladding or façade board.

U.S. Pat. No. 8,221,663 describes a method of making foamed articles having a density of not more than 1.3 g/cm$^3$.

One problem related to methods for preparing polymer-wood compositions is to ensure that the conditions are such that articles with desired properties, such as weldability, can be achieved. In some embodiments, it is important to be able to obtain symmetrical articles having fine details and specific profiles and shapes. A further problem relates to ensuring that a sufficiently high proportion of cellulosic fiber can be used, yet resulting in an article with the desired properties.

Thus, there is a need in the art to provide polymer-wood composite products that overcome the above-described problems, as well as methods of making such polymer-wood composite materials.

SUMMARY OF THE INVENTION

The present invention is directed to a method of making a foamed cellulosic fiber-thermoplastic composite article. The method includes the steps of providing a copolymer composition, combining the copolymer composition and cellulosic fibers, applying heat, mixing energy and pressure to the copolymer composition and cellulosic fibers mixture to form a foamable mixture, and forming the foamed article by placing the foamable mixture in a molding or extruding operation.

The method is characterized in that at least 10% of the cellulosic fibers has been thermally modified prior to being combined with the copolymer composition. By using cellulose fibers that have been thermally modified, the foaming in the method can be controlled such that articles with desired properties can more readily be obtained. It has also been found that using thermally modified cellulosic fibers, a higher proportion of fiber can be used, still ensuring that the articles manufactured have the desired properties.

The copolymer composition includes i) a copolymer formed by polymerizing a mixture containing a) about 51% to about 99.9% by weight of one or more primary monomers, b) about 0.1% to about 49% by weight of one or more anhydride containing monomers, and c) optionally about 1% to about 25% by weight of one or more other polymerizable monomers; and optionally about 0.1% to about 30% by weight of one or more elastomeric polymers, based on the weight of the copolymer.

About 30% to about 99.99% by weight of the copolymer composition is combined with about 0.01% to about 70% by weight of one or more cellulosic fibers based on the weight of the combination.

The heat, mixing energy and pressure provide i) mixing of the copolymer composition and the cellulosic fibers; ii) reaction of anhydride groups in the copolymer with hydroxyl groups in the cellulosic fibers; and iii) production of a blowing agent as a byproduct of the reaction in ii) to provide a foamable mixture of the copolymer composition and the cellulosic fibers.

DETAILED DESCRIPTION OF THE INVENTION

As used herein, the term "elastomeric polymer" refers to a natural or synthetic polymer, rubber, or rubberoid material, which has the ability to undergo deformation under the influence of a force and regain its original shape once the force has been removed.

As used herein, the term "encased sinusoidal foam structure" refers to an extruded article that includes an outer casing encompassing the outer cross-sectional surface of the article and a foamed interior portion, within the outer casing, that has a lower density than the outer casing and has a wave-like structure in the extrusion direction oscillating about a mid-point of the article, where the peak deviations from the mid-point are in contact with and fused to an inner portion of the outer casing.

As used herein the terms "foam" or "foamed" refer to a solid that includes the cellulosic fiber-thermoplastic composite described herein with voids, pockets, cells, a cellular structure and/or bubbles dispersed within the solid that contain a gas, which can include, as non-limiting examples, air, carbon dioxide, water vapor, and combinations thereof.

As used herein the term "flax fibers" refers to cellulosic fibers derived from plants, sometimes referred to as linseed, that are a member of the genus *Linum* in the family Linaceae.

As used herein the term "hardwood fiber" refers to cellulosic fibers derived from broad-leaved trees, non-limiting examples including oak, eucalyptus and birch, having a relatively higher density and hardness compared to softwood trees.

As used herein the term "jute fibers" refers to the long, soft, shiny vegetable fiber produced from plants in the genus *Corchorus*, family Malvaceae.

As used herein the term "kenaf fibers" refers to cellulosic fibers derived from Kenaf (*Hibiscus cannabinus*), a species of *Hibiscus*, native to southern Asia.

As used herein the term "hardwood pulp" refers to hardwood fiber that has been crushed with grinders, crushed with refiners using steam at high pressures and temperatures, chemically broken up, or a combination of methods to produce a soft shapeless mass.

As used herein the term "hemp fibers" refers to cellulosic fibers derived from plants belonging to the genus *Cannabis*.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "polymer" is meant to encompass, without limitation, homopolymers, copolymers and graft copolymers.

As used herein the term "ramie fibers" refers to cellulosic fibers derived from a flowering plant in the nettle family Urticaceae, native to eastern Asia.

As used herein the term "softwood fiber" refers to cellulosic fibers derived from cone-bearing seed plants with vascular tissue, non-limiting examples including cedars, cypresses, Douglas-firs, firs, junipers, kauris, larches, pines, hemlock, redwoods, spruces, and yews.

As used herein the term "softwood pulp" refers to softwood fiber that has been crushed with grinders, crushed with refiners using steam at high pressures and temperatures, chemically broken up, or a combination of methods to produce a soft shapeless mass.

As used herein the term "wood flour" refers to finely pulverized wood, generally made from sapless softwoods such as pine or fir, or in some cases from hardwoods.

In the present invention, an article containing a foamed cellulosic fiber-thermoplastic composite that includes a copolymer containing anhydride functional groups and can be produced by combining the fiber and thermoplastic in an extruder under pressure and extruding a self-foaming composite to form a foamed article.

In one embodiment of the present invention, the article produced is a door or window member, cladding or siding boards or supporting trim boards.

In the present invention, at least 10% of the cellulosic fibers have been thermally modified, also referred to as heat treated, prior to being combined with the copolymer composition. In one embodiment at least 10% of the cellulosic fibers have been thermally modified prior to being combined with the copolymer composition. In one embodiment at least 20% or at least 30% or at least 40% or at least 50% or at least 60% or at least 70% or at least 80% or at least 90% or at least 95% or at least 98% or at least 99% of the cellulosic fiber used has been thermally modified prior to being combined with the copolymer composition.

The thermal modification step can be done in an essentially oxygen free environment. This can be an advantage if high temperatures are used since wood easily ignites at high temperatures but the absence of oxygen will eliminate that risk.

During the thermal modification step, the wood or cellulosic fiber is heated at a temperature of from 160° C. to 250° C. at atmospheric pressure or at a temperature of from 120° C. to 230° C. at a pressure higher than atmospheric pressure. In one embodiment, the temperature is between 200° C. and 250° C. at atmospheric pressure.

The time required for the thermal modification step depends on the wood or cellulosic fiber used, but is generally in the range of from 30 seconds to 5 hours, such as about 2 hour to 4 hours. The process parameters chosen for the thermal modification of the wood or cellulosic fiber depends on the wood or cellulosic fiber used. The resultant fiber has permanently modified properties such as reduction of EMC (Equilibrium moisture content) by as much as 40-50% and significantly improved biological resistance to wood destroying fungi. During the thermal modification, extractives are evaporated and the thermally modified cellulosic fibers contain less volatile compounds than cellulosic fibers that have not been thermally modified. Therefore, cellulosic fibers that have been thermally modified are also less flammable than cellulosic fibers that have not been thermally modified. The thermal modification may also change the morphological and size properties of the fibers, which may be advantageous in embodiments of the present invention. Further, the thermally modified cellulosic fibers have a lower thermal conductivity than non-thermally modified cellulosic fibers.

In one embodiment, a temperature gradient is used during the thermal modification step. In this embodiment, the wood or cellulosic fiber is first heated to a consistent temperature throughout the cross section of the wood pieces or cellulosic fibers, followed by a rapid cooling to create a temperature gradient whereby the core of the wood of fiber has a higher temperature than the surface.

The pressure used during the thermal modification step may be atmospheric pressure, but the thermal modification can also be carried out under elevated pressure, such as 1.5 to 13 bar.

In one embodiment of the present invention, the cellulosic fiber that has been thermally modified can be mixed with cellulosic fiber that has not been thermally modified, such as regular saw dust, in a pre-mix step prior to being combined with the copolymer composition. In one embodiment of the present invention, the mixture of thermally modified and non-thermally modified cellulosic fibers is compressed into pellets prior to being combined with the copolymer composition.

Under the conditions in the extruder, the anhydride groups in the copolymer are able to react and bind to the hydroxyl groups in the cellulosic fiber resulting in a stronger compounded matrix of thermoplastic and cellulose. This copolymer-cellulose reaction results in a composite having superior tensile properties along with other superior physical properties compared to prior art materials.

An aspect of the reaction between anhydride groups in the copolymer with the hydroxyl groups in the cellulosic fiber is a resulting byproduct that can include water and/or carbon dioxide. Under extrusion conditions, the water and/or carbon dioxide act as a blowing agent, which results in a cellular structure or foam in at least a portion of the cross-section of the extruded article. The foam or cellular structure causes the density of the extruded article to be lower, often less dense than water, and provides many of the unique properties of the cellulosic fiber-thermoplastic composite articles made according to the invention.

In embodiments of the invention, the mixture of copolymer and cellulose are exposed to extruder temperatures of at least 180° C., in some cases at least 185° C., in other cases at least 190° C., in some instances at least 195° C. and in other instances at least 200° C. The exact extruder temperature will vary based on the length of time at temperature, melt temperature and/or glass transition temperature (Tg) of the copolymer, and the activation temperature required for a particular copolymer-cellulose combination to react as described herein. The mixture of copolymer and cellulose are exposed to extruder temperatures of up to 240° C., in some cases up to 237° C., in other cases up to 233° C., in some instances up to 229° C. and in other instances up to 225° C. The exact maximum extruder temperature will vary based on the thermal degradation expected from the copolymer and cellulosic material being used. Maximum temperatures are chosen so as to minimize thermal degradation of the copolymer and cellulosic material. The extruder temperatures the copolymer and cellulosic material are exposed to in order to promote the reaction between them can be any temperature or range between any of the temperatures described above.

In embodiments of the invention, the mixture of copolymer and cellulose are exposed to extruder pressures of at least 1 psi (6.9 KPa), in some cases at least 5 psi (34.5 KPa), and in other cases at least 10 psi (69 KPa). Further, the mixture of copolymer and cellulose are exposed to extruder pressures of up to 2000 psi (13,790 KPa), in some cases up to 1000 psi (6895 KPa), in other cases up to 500 psi (3447 KPa), in some instances up to 250 psi (1724 KPa) and in other instances up to 150 psi (1034 KPa). The exact extruder pressure will vary based on the particular copolymer-cellulose combination being used and the amount and type of foaming desired from the reaction as described herein. The extruder pressures the copolymer and cellulosic material are exposed to in order to allow for the foaming reaction between the copolymer and cellulosic material can be any pressure or range between any of the pressures described above.

In particular embodiments of the invention, a center portion of a cross-section of the present cellulosic fiber-thermoplastic composite article is foamed and the portion around the edge or perimeter of the present cellulosic fiber-thermoplastic composite article is minimally foamed or not foamed at all.

The density of the foamed cellulosic fiber-thermoplastic composite articles, as a whole, of this embodiment are often less than 1.1 g/cm$^3$, in many cases less than 1 g/cm$^3$, and can be less than 0.97 g/cm$^3$, in some cases less than 0.9 g/cm$^3$, in other cases less than 0.85 g/cm$^3$, and in some instances less than 0.8 g/cm$^3$. The density of the foamed cellulosic fiber-thermoplastic composite articles will depend on the composition of the copolymer, amount and type of cellulosic material, the amount of moisture present, as well as the particular processing conditions. In particular aspects of the invention and depending on any additional fillers that may be used, the density of the micro foamed material can be up to 1.3 and in some cases up to 1.2 g/cm$^3$.

As used herein, the term "micro foamed" refers to a material where the cellulosic fibers are well, and in many cases homogenously, dispersed with the copolymer and small voids, typically less than 50 μm, are dispersed throughout the material.

As used herein, the term "structured foam" refers to a material where the cellulosic fibers are well, and in many cases homogenously, dispersed with the copolymer and large voids, typically greater than 50 μm, are located throughout the material, separated by walls, that can be from 50 μm to 10 mm thick. In some cases, the size distribution of the large voids can be large.

In embodiments of the invention, the extruded article can be uniformly micro foamed. As such, cellulosic fibers are well, and in many cases homogenously, dispersed with the copolymer and small voids, typically less than 50 μm, are dispersed throughout the material.

Thus, an important aspect of the present invention is controlling the nature of the foamed article (micro foamed or structured foam), the density of the foamed article as well as the shape of the finally produced foamed cellulosic fiber-thermoplastic composite.

The amount of copolymer in the cellulosic fiber-thermoplastic composite will vary depending on its intended use as described herein and the physical properties desired in the article. As such, the cellulosic fiber-thermoplastic composite will contain the copolymer at a level of at least about 10%, in some cases at least about 15%, in other cases at least about 20%, in some instances at least about 25%, in other instances at least about 30%, and in some situations at least about 35% by weight of the cellulosic fiber-thermoplastic composite. Also, the copolymer can be present at up to about 94.9%, in some cases up to about 92.5%, in other cases up to about 90%, in some instances up to about 85%, in some instances up to about 80%, in other instances up to about 75% and in some situations up to about 70% by weight of the cellulosic fiber-thermoplastic composite. The amount of copolymer in the cellulosic fiber-thermoplastic composite can be any value or range between any of the values recited above.

The amount of cellulosic fiber in the cellulosic fiber-thermoplastic composite will vary depending on its intended use as described herein, the amount and type of foaming desired, and the physical properties desired in the article. As such, the amount of cellulosic fiber in the cellulosic fiber-thermoplastic composite can be at least about 0.01%, in some situations at least about 0.1%, in other situations at least about 1%, in particular situations at least about 5%, in some cases at least about 10%, in other cases at least about 15% and in some instances at least about 20% by weight of the cellulosic fiber-thermoplastic composite. Also, the amount of cellulosic fiber in the cellulosic fiber-thermoplastic composite can be up to about 70%, in some situations up to about 65%, in other situations up to about 60%, in some cases up to about 55%, in other cases up to about 50%, in some instances up to about 45%, and in other instances up to about 40% by weight of the cellulosic fiber-thermoplastic composite. The amount of cellulosic fiber in the cellulosic fiber-thermoplastic composite can be any value or range between any of the values recited above.

The copolymer used in the cellulosic fiber-thermoplastic composite provides improved strength and stiffness compared with prior art wood or cellulosic filled molded polyolefin thermoplastics. Particularly, the copolymer used in the present cellulosic fiber-thermoplastic composite is less susceptible to creep and/or warpage when subjected to continuous loads and/or high ambient temperatures. The heat stability, as measured by the deflection temperature under load (DTUL) according to ISO-75-2, of the present cellulosic fiber-thermoplastic composite is also improved compared to prior art wood or cellulosic filled molded thermoplastics.

The copolymer used in the cellulosic fiber-thermoplastic composite contains residues formed by polymerizing a mixture that contains one or more primary monomers, one or more anhydride containing monomers and optionally one or more other polymerizable monomers.

The primary monomers are selected from styrenic monomers and olefinic monomers and combinations thereof.

The amount of primary monomer residues in the present copolymer depends on the physical properties desired in the article to be made, the amount and type of cellulosic fiber to be used and the type and amount of elastomeric polymer that is used. Typically, the amount of primary monomer residues present in the copolymer is at least about 51%, in some cases at least 55% and in other cases at least 60% based on the weight of the copolymer. Also, the amount of primary monomer residues present in the copolymer can be up to about 99.9%, in some situations up to about 99%, in other situations up to about 95%, in some cases up to about 90%, in other cases up to about 85%, in some instances up to about 80%, and in other instances up to about 75% by weight of the copolymer. The amount and type of primary monomer residues in the copolymer can be any value or range between any of the values recited above.

Any suitable styrenic monomer can be used as one or more of the primary monomers in the invention. Suitable styrenic monomers are those that provide the desirable properties in the present article as described herein. Non-limiting examples of suitable styrenic monomers include, but are not limited to styrene, p-methyl styrene, α-methyl styrene, tertiary butyl styrene, dimethyl styrene, nuclear brominated or chlorinated derivatives thereof and combinations thereof.

Any suitable olefinic monomer can be used as one or more of the primary monomers in the invention. Suitable olefinic monomers are those that provide the desirable properties in the present article as described herein. Non-limiting examples of suitable olefinic monomers include, but are not limited to ethylene; alpha olefins such as propylene, 1-butene, 1-pentene, 1-hexene, 1-heptene, 1-octene, 1-nonene, 1-decene and 1-dodecene; 2-butene; 2-pentene; 2-hexene; 2-octene; and combinations thereof.

The amount of anhydride containing monomer residues in the present copolymer depends on the physical properties desired in the article to be made and the amount and type of cellulosic fiber to be used. Typically, the amount of anhydride containing monomer residues present in the copolymer is at least about 0.1%, in some instances at least about 1%, in other instances at least about 5%, in some cases at least 10% and in other cases at least 15% based on the weight of the copolymer. Also, the amount of anhydride containing monomer residues present in the copolymer can be up to about 49%, in some cases up to about 45%, in other cases up to about 40%, and in some instances up to about 35% by weight of the copolymer.

The amount of anhydride containing monomer residues in the copolymer can be any value or range between any of the values recited above.

Any suitable anhydride containing monomer can be used in the invention. Suitable anhydride containing monomers are those that provide the desirable properties in the present article as described herein and include, but are not limited to those corresponding to Formulas I and II:

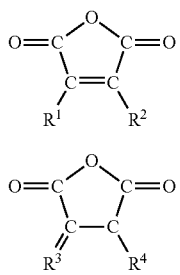

where $R^1$, $R^2$ and $R^4$ are each independently H or a $C_1$-$C_8$ linear, branched or cyclic alkyl or alkenyl radical and $R^3$ is a $C_1$-$C_8$ linear or branched alkyl group.

As non-limiting examples, a suitable anhydride containing monomer according to Formula I is maleic anhydride and a suitable anhydride containing monomer according to Formula II is itaconic anhydride.

The amount of and type of other monomer residues in the present copolymer depends on the physical properties desired in the article to be made, the amount and type of cellulosic fiber to be used and the type and amount of elastomeric polymer that is used. When included, the amount of the optional other monomer residues present in the copolymer is at least about 1%, in some cases at least 5% and in other cases at least 10% based on the weight of the copolymer. Also, the amount of other monomer residues present in the copolymer can be up to about 25%, in some cases up to about 20%, and in other cases up to about 15%, by weight of the copolymer. The amount of other monomer residues in the copolymer can be any value or range between any of the values recited above.

Any suitable polymerizable monomer can be included as an "other monomer" as described herein. Suitable other monomers are those that provide the desirable properties in the present article as described herein and include, but are not limited to divinylbenzene, conjugated dienes, $C_1$-$C_{12}$ linear, branched or cyclic alkyl mono- or di-esters of maleic acid, fumaric acid and itaconic acid; $C_1$-$C_{12}$ linear, branched or cyclic alkyl esters of acrylic acid and methacrylic acid, acrylonitrile, methacrylonitrile, and combinations thereof.

The resulting copolymer formed by polymerizing the above-described monomers can have a weight average molecular weight (Mw, measured using GPC with polystyrene standards) of at least 20,000, in some cases at least 35,000 and in other cases at least 50,000. Also, the Mw of the resulting copolymer can be up to 1,000,000, in some cases up to 750,000, and in other cases up to 500,000. The Mw of the copolymer can be any value or range between any of the values recited above.

As a non-limiting example, suitable copolymers that can be used in the invention include the styrene/maleic anhydride copolymers available from Polyscope, Netherlands.

Optionally, and in some embodiments of the invention, one or more elastomeric polymers can be included in the cellulosic fiber-thermoplastic composite, to provide a rubber modified cellulosic fiber filled thermoplastic composite.

When included in the present cellulosic fiber-thermoplastic composite, the amount of elastomeric polymers in the cellulosic fiber-thermoplastic composite will vary depending on its intended use as described herein and the physical properties desired in the article. As such, the amount of elastomeric polymers in the cellulosic fiber-thermoplastic composite can be at least about 0.1%, in some cases at least about 0.25%, in other cases at least about 0.5%, in some instances at least about 1%, in other instances at least about 2.5% and in some situations at least about 5% by weight of the cellulosic fiber-thermoplastic composite. Also, the amount of elastomeric polymers in the cellulosic fiber-thermoplastic composite can be up to about 30%, in some cases up to about 25% and in other cases up to about 20% by weight of the cellulosic fiber-thermoplastic composite. The amount of elastomeric polymers in the cellulosic fiber-thermoplastic composite can be any value or range between any of the values recited above.

The elastomeric polymers can be combined with the copolymer by blending or admixing with the copolymer or by combining the elastomeric polymers with the monomers prior to or during polymerization.

Any suitable elastomeric polymer can be used in the invention. In some embodiments of the invention, combinations of elastomeric polymers are used to achieve desired properties. Suitable elastomeric polymers are those that provide the desirable properties in the present article as described herein and are desirably capable of resuming their shape after being deformed.

In an embodiment of the invention, the elastomeric polymers include, but are not limited to homopolymers of butadiene or isoprene or other conjugated diene, and random, block, AB diblock, or ABA triblock copolymers of a conjugated diene (non-limiting examples being butadiene and/or isoprene) with a styrenic monomer as defined above and/or acrylonitrile. In particular embodiments of the invention the elastomeric polymers include acrylonitrile-butadiene-styrene copolymers (ABS).

In a particular embodiment of the invention, the elastomeric polymers include one or more block copolymers selected from diblock and triblock copolymers of styrene-butadiene, styrene-butadiene-styrene, styrene-isoprene, styrene-isoprene-styrene, partially hydrogenated styrene-isoprene-styrene and combinations thereof.

As used herein, butadiene refers to 1,3-butadiene and when polymerized, to repeat units that take on the 1,4-cis, 1,4-trans and 1,2-vinyl forms of the resulting repeat units along a polymer chain.

In some embodiments of the invention, the elastomeric polymer does not include diene type monomers. In these instances the elastomeric polymers can include copolymers of C1-C12 linear, branched or cyclic olefins, C1-C12 linear, branched or cyclic alkyl esters of (meth)acrylic acid, styrenic monomers, and/or (meth)acrylonitrile. Non-limiting examples of this type of elastomeric polymer are the ELVALOY® modifiers for synthetic resins available from E. I. Dupont de Nemours and Company, Wilmington, Del.

In an embodiment of the invention, the elastomeric polymer has a number average molecular weight (Mn) greater than 6,000, in some cases greater than 8,000, and in other cases greater than 10,000 and a weight average molecular weight (Mw) of at least 25,000 in some cases not less than about 50,000, and in other cases not less than about 75,000 and the Mw can be up to 500,000, in some cases up to 400,000 and in other cases up to 300,000. The weight average molecular weight of the elastomeric polymer can be any value or can range between any of the values recited above.

Non-limiting examples of suitable block copolymers that can be used in the invention include the STEREON® block copolymers available from the Firestone Tire and Rubber Company, Akron, Ohio; the ASAPRENE™ block copolymers available from Asahi Kasei Chemicals Corporation, Tokyo, Japan; the KRATON® block copolymers available from Kraton Polymers, Houston, Tex.; and the VECTOR® block copolymers available from Dexco Polymers LP, Houston, Tex.

Any suitable cellulosic fiber can be used in the cellulosic fiber-thermoplastic composite of the invention. Suitable cellulosic fibers include those that, together with the copolymer and optional elastomeric polymers provide the desired properties in the article described herein.

The cellulosic fiber-thermoplastic composite includes cellulosic materials that are derived from wood as well as those not derived from wood (i.e., other than wood flour, fibers, or pulp, etc.) and can be used, either in addition to or instead of wood-derived materials. Thus, cellulosic fibers can include cellulose in any of a number of forms, including as nonlimiting examples wood flour or fibers, wood pulp, wheat fibers, rice hulls, kenaf, flax, hemp, hardwood fiber, kenaf fibers, wheat fibers, rice hulls, hemp fibers, jute fibers, flax fibers, ramie fibers, softwood fibers, hardwood pulp, softwood pulp, wood flour and combinations thereof. In many cases wood fibers or flour are used, and any commercially available variety is generally suitable for use according to the invention.

The cellulosic fibers can include high aspect ratio materials, low aspect ratio materials, and combinations of each. High aspect ratio fibers offer an advantage, that being a higher strength and modulus for the same level of fiber content in the cellulosic fiber-thermoplastic composite. The use of cellulosic fiber materials is advantageous for several reasons. Cellulosic fibers can generally be obtained at relatively low cost. Cellulosic fibers are relatively light in weight, can maintain a high aspect ratio after processing in high intensity thermokinetic mixers, and exhibit low abrasive properties, thus extending machine life.

In embodiments of the invention, the high aspect ratio cellulosic fibers have an aspect ratio of greater than 10, in some cases at least about 15 and in other cases at least about 20 and can have an aspect ratio of up to about 1,000, in some cases up to about 750, in other cases up to about 500 and in other cases up to about 250. In particular embodiments of the invention, the high aspect ratio cellulosic fibers have an aspect ratio of greater than 50, in some cases greater than 100, in other cases greater than 200 and in some instances greater than 500. The aspect ratio of the high aspect ratio cellulosic fibers can be any value or range between any of the values recited above.

In embodiments of the invention, the low aspect ratio cellulosic fibers have an aspect ratio of at least about 1, in some cases at least about 1.25 and in other cases at least about 1.5 and can have an aspect ratio of up to 10, in some cases up to about 7.5, in other cases up to about 5 and in some instances up to about 2.5. The aspect ratio of the low aspect ratio cellulosic fibers can be any value or range between any of the values recited above.

In embodiments of the invention, the cellulosic fibers have a diameter of at least about 1, in some cases at least about 2.5, and in other cases at least about 5 μm and can have a diameter of up to about 500, in some cases up to about 400, in other cases up to about 300, in some instances up to about 250 μm. The diameter of the low aspect ratio cellulosic fibers can be any value or range between any of the values recited above.

In some embodiments of the invention, the wood flour has a particle size of not more than 10, in some cases not more than 20, in other cases not more than 30 and in some instances not more than 40 mesh, in other instances not more than 50 mesh and in some situations not more than 60 mesh. The wood flour can have a moisture content of not more than 10%, in some cases not more than 9%, in other cases not more than 8%, in some instances not more than 7%, in some situations not more than 6% and in other instances not more than 5% by weight. However, any variety of hardwood or softwood could be used, usually dependent on the location of the manufacturer.

It should be noted that no explicit demarcation exists for determining the line between when a particular cellulosic fiber is no longer considered wood flour and is instead considered wood fiber. As such, according to the present invention, it will often be the case that wood flour will contain some wood fibers and wood fibers will contain some amount of wood flour.

In some embodiments of the invention, the cellulosic fiber can include recycled paper, and in particular embodiments, pelletized recycled paper.

In an embodiment of the invention, the cellulosic fiber-thermoplastic composite can be compounded or otherwise blended with one or more other polymers to form a cellulosic fiber-thermoplastic composite blend. Suitable other polymers that can be blended or compounded with the cellulosic fiber-thermoplastic composite composition include, but are not limited to crystal polystyrene, high impact polystyrenes, polyphenylene oxide, copolymers of styrene and maleic anhydride and/or $C_1$-$C_{12}$ linear, branched or cyclic alkyl (meth)acrylates, rubber-modified copolymers of styrene and maleic anhydride and/or $C_1$-$C_{12}$ linear, branched or cyclic alkyl (meth)acrylates, polycarbonates, polyamides (such as the nylons), polyesters (such as polyethylene terephthalate, PET), polyolefins (such as polyethylene, polypropylene, and ethylene-propylene copolymers), polyphelyne ether (PPE), polyvinylidene fluoride, acrylonitrile/(meth)acrylate copolymers, ethylene/vinyl acetate copolymers, polyoxymethylene, acetal copolymer, ethylene vinyl alcohol copolymers, and combinations thereof.

In particular embodiments of the invention, the compounded blend includes polyoxymethylene (POM or Acetal), which, as a non-limiting example is available under the trade name DELRIN® from E.I. DuPont De Nemours and Company, Wilmington, Del.

When a cellulosic fiber-thermoplastic composite blend is used, the blend will typically include at least 1%, in some instances at least 5%, and in other instances at least 10%, in some cases at least 25%, and in other cases at least 35% and up to 99%, in some instances up to 95%, in other instances up to 90%, in some cases up to 75%, and in other cases up to 65% by weight based on the blend of the present cellulosic fiber-thermoplastic composite. Also, the blend will typically include at least 1%, in some instances at least 5%, and in other instances at least 10%, in some cases at least 25%, and in other cases at least 35% and up to 99%, in some instances up to 95%, in other instances up to 90%, in some cases up to 75%, and in other cases up to 65% by weight based on the blend of the other polymers. The amount of the present cellulosic fiber-thermoplastic composite and other polymers in the blend is determined based on the desired properties in the articles to be made using the blend composition. The amount of the present cellulosic fiber-thermoplastic composite and other polymers in the blend can be any value or range between any of the values recited above.

The present cellulosic fiber-thermoplastic composite can include one or more additives known in the art. Suitable additives include, but are not limited to heat stabilizers, light stabilizers, antioxidants; plasticizers, dyes, pigments; anti-blocking agents; slip agents; lubricants; coloring agents; ultraviolet light absorbers; fillers; anti-static agents; impact modifiers, antimicrobial agents, and combinations thereof. Unless otherwise indicated, each of the additives can be included in amounts of less than about 5, in some cases less than about 4, in other cases less than about 3, and in some instances less than about 2 weight % based on the cellulosic fiber-thermoplastic composite. Typically, the total amount of additives in the cellulosic fiber-thermoplastic composite will be less than about 12, in some cases less than about 10 and in other cases less than about 8 weight % based on the cellulosic fiber-thermoplastic composite.

Suitable heat stabilizers that can be used in the invention include, but are not limited to, phosphite or phosphonite stabilizers and hindered phenols, non-limiting examples being the IRGANOX® stabilizers and antioxidants available from Ciba Specialty Chemicals.

Generally, any conventional ultra-violet light (UV) stabilizer known in the art can be utilized in the present invention. Non-limiting examples of suitable UV stabilizers include 2-hydroxy-4-(octyloxy)-benzophenone, 2-hydroxy-4-(octyl oxy)-phenyl phenyl-methanone, 2-(2'-hydroxy-3,5'di-teramylphenyl) benzotriazole, and the family of UV stabilizers available under the trade TINUVIN® from Ciba Specialty Chemicals Co., Tarrytown, N.Y.

Suitable plasticizers that can be used in the invention include, but are not limited to cumarone-indene resin, a terpene resin, and oils.

As used herein, "pigments and/or dyes" refer to any suitable inorganic or organic pigment or organic dyestuff. Suitable pigments and/or dyes are those that do not adversely impact the desirable physical properties of the article. Non-limiting examples of inorganic pigments include titanium dioxide, iron oxide, zinc chromate, cadmium sulfides, chromium oxides and sodium aluminum silicate complexes. Non-limiting examples of organic type pigments include azo and diazo pigments, carbon black, phthalocyanines, quinacridone pigments, perylene pigments, isoindolinone, anthraquinones, thioindigo and solvent dyes. The pigments can be white or any other color. The white pigment can be produced by the presence of titanium oxide, zinc oxide, magnesium oxide, cadmium oxide, zinc chloride, calcium carbonate, magnesium carbonate, etc., or any combination thereof in the amount of 0.1 to 20% by weight, depending on the white pigment to be used. The colored pigment can be produced by carbon black, phtalocyanine blue, Congo red, titanium yellow or any other coloring agent known, as for example, in the printing industry.

Suitable anti-blocking agents, slip agents or lubricants include, but are not limited to silicone oils, liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, and higher fatty amides. Suitable lubricants include, but are not limited to, ester waxes such as the glycerol types, the polymeric complex esters, the oxidized polyethylene type ester waxes and the like, metallic stearates such as barium, calcium, magnesium, zinc and aluminum stearate, salts of 12-hydroxystearic acid, amides of 12-hydroxystearic acid, stearic acid esters of polyethylene glycols, castor oil, ethylene-bis-stearamide, ethylene bis cocamide, ethylene bis lauramide, pentaerythritol adipate stearate and combinations thereof.

Suitable ultraviolet light absorbers that can be used in the invention include, but are not limited to 2-(2-hydroxyphenyl)-2H-benzotriazoles, for example, known commercial hydroxyphenyl-2H-benzotriazoles and benzotriazoles hydroxybenzophenones, acrylates, malonates, sterically hindered amine stabilizers, sterically hindered amines substituted on the N-atom by a hydroxy-substituted alkoxy group, oxamides, tris-aryl-o-hydroxyphenyl-s-triazines, esters of substituted and unsubstituted benzoic acids, nickel compounds, and combinations thereof.

Suitable fillers are those that do not adversely impact, and in some cases enhance, the desirable physical properties of the article. Suitable fillers include, but are not limited to, calcium carbonate in ground and precipitated form, barium sulfate, talc, glass, clays such as kaolin and montmorolites, mica, silica, alumina, metallic powder, glass spheres, barium stearate, calcium stearate, aluminum oxide, aluminum hydroxide, titanium dioxide, diatomaceous earth, glass fibers, fiberglass and combinations thereof. The amount of filler is in many cases less than 10% of the total weight of the cellulosic fiber-thermoplastic composite.

Examples of suitable anti-static agents include, but are not limited to glycerine fatty acid, esters, sorbitan fatty acid esters, propylene glycol fatty acid esters, stearyl citrate, pentaerythritol fatty acid esters, polyglycerine fatty acid esters, and polyoxethylene glycerine fatty acid esters.

Examples of suitable impact modifiers include, but are not limited to high impact polystyrene (HIPS), styrene/butadiene block copolymers, ABS, copolymers of $C_1$-$C_{12}$ linear, branched or cyclic olefins, $C_1$-$C_{12}$ linear, branched or cyclic alkyl esters of (meth)acrylic acid, styrenic monomers, styrene/ethylene/-butene/styrene, block copolymers, styrene/ethylene copolymers. The amount of impact modifier used is typically in the range of 0.5 to 25% of the total weight of cellulosic fiber-thermoplastic composite.

Examples of suitable antimicrobial agents that can be used in the invention include one or more of the various fungicides, herbicides, insecticides, and other such materials known in the art. As non-limiting examples, the antimicrobial agents can include sodium, potassium, calcium, zinc, copper, and barium salts of carbonate, silicate, sulfate, halide, and borate in all forms; zinc carboxylates; boric acids; sodium dichromate; copper chrome arsenate (CCA); chromated copper borate (CBC); ammoniacal copper arsenate (ACA); ammoniacal copper zinc arsenate (ACZA); copper chromium fluoride (CFK); copper chromium fluoroborate (CCFB); copper chromium phosphorous (CCP); propiconazole tebuconazole; organo-chloride such as pentachlorophenol (PCP); quaternary ammonium compounds (AAC); copper 8-hydroxyquinoline or copper oxene; tri-n-butyltin oxide (TBTO); tri-n-butyltin naphthenate (TBTN); didecyldimethylammonium bromide (DDAB); didecyldimethylammonium chloride (DDAC); silver ions, mercury ions, carbamates, isothiazolones, chlorinated phenoxy and polyhexamethylene beguanidide hydrochlorides, and combinations thereof.

Other antimicrobial agents that can be used in the invention include, but are not limited to 1-[(6-chloro-3-pyridinyl)methyl]-4,5-dihydro-N-nitro-1H-imidazol-2-amine and 3-(2,2-dichloroethenyl)-2,2-di-methylcyclo-propanecarboxylic acid cyano(3-phenoxyphenyl)-methyl ester (cypermethrin), the active ingredient in, for example, Demon TC sold by Zeneca; 3-(2,2-dichloro-ethenyl)-2,2-dimethylcyclopropanecarboxylic acid (3-phenoxyphenyl)methyl ester (permethrin), the active ingredient in, for example, Dragnet FT and Torpedo sold by Zeneca; and 1-[(6-chloro-3-pyridinyl)methyl]-4,5-dihydro-N-nitro-1H-imidazol-2-amine (imidacloprid), the active ingredient in, for example, Premise sold by Bayer.

Non-limiting examples of some specific antimicrobial agents include, but are not limited to barium metaborate monohydrate (sold under the trade-mark Busan 11-M1, manufactured by Buckman Labs), 2-N-octyl-4-isothiazolin-3-one Vinyzene IT (sold under the trade-mark Skane Morton, manufactured by DOW), octyl isothiazolone, dichloro-octyl isothiazolone, trichloro-phenoxy phenol, Triclosan, 10,10'-oxybisphenoarsine Vinyzene BP (sold under the trademark Morton, manufactured by DOW), silver-hydroxyapatite complex (sold under the trade-mark Apacider, manufactured by Sangi Co. Ltd.), 2,3,5,6-tetrachloro-4(methyl sulphonyl) pyridine (sold under the trade-mark Densi I, manufactured by ICI), 2-(thiocyanomethylthio) benzothiazole (sold under the trade-mark Busan 1030, manufactured by Buckman Labs), N-(trichloromethyl thio)-phthalimide (sold under the trade-mark Fungitrol II, manufactured by Huels), 3-iodo-2-propynyl butyl carbamate (sold under the trademark Polyphase AF-1, manufactured by Troy Chemical). This list is by no means exhaustive but includes some representatives which can be applied according to the current invention to control biodegradative processes.

Other antimicrobial agents that can be used include, as non-limiting examples, PHMD, Triclosan, Irgansan DP300, MICROBAN® products, chlorinated phenoxy 5-chloro-2-(2,4-dichlorophenoxy)phenol, polyhexamethlyene biguanidie hydrochloride, CH3635, Ster-zac, 5-chloro-2-(2,4-dichlorophenoxy)-phenol, chloro-2-)2,4-dichloro)phenol, Chloro-2-(2,4-dichlorophenoxy)phenol, Lexol 300, trichloro-2-hydroxydiphenyl ether, and the antimicrobial agents described in the following U.S. Patents, the relevant portions of which are herein incorporated by reference; U.S. Pat. Nos. 5,586,643, 5,288,480, 4,098,877, 5,069,907 and 5,238,749. Many of these compounds are sold by the Microban Products Company, Huntsville, N.C. Other suitable chemical components having known antimicrobial biocidal or biostatic characteristics may also be used in the present invention.

Non-limiting examples of natural antimicrobial agents that can be used in the invention include, but are not limited to essential oils such as tea tree oil, mint oil, leleshwa oil, sandalwood oil, clove oil, lavender oil, nigella sativa (Black cumin) oil, onion and combinations thereof.

As non-limiting examples, the present foamed cellulosic fiber-thermoplastic composite article can be made by forming pellets of the cellulosic fiber-thermoplastic composite and then molding or extruding the pellets to form the present article, or the cellulosic fiber-thermoplastic composite composition can be formed in an extruder and extruded directly to form the articles of the invention.

In embodiments of the present methods, either method can include dry blending the copolymer, cellulosic fiber and optional elastomeric polymers and/or optional other additives and subsequently adding them to an extruder.

In embodiments of the invention, the copolymer, cellulosic fibers and optional elastomeric polymers and/or optional other additives can be combined by melt blending.

In other embodiments of the present method, either method can include adding the copolymer and optionally the elastomeric polymer to a first extruder and then combining them with the cellulosic fiber and optional other additives in a second extruder.

In embodiments of the invention, the copolymer and optional elastomeric copolymer can be combined by melt blending.

Regardless of which method is used, during the blending step, the copolymer and cellulosic fiber are typically intimately mixed by high shear mixing to form a copolymer-cellulosic fiber composite where the mixture includes a continuous copolymer phase and cellulosic fiber dispersed phase with some reaction taking place between the copolymer and cellulosic fibers as described herein. The dispersed cellulosic fibers can be suspended or dispersed throughout the copolymer phase. The manufacture of the dispersed fiber phase within a continuous copolymer phase can require substantial mechanical input. Such input can be achieved using a variety of mixing means including extruder mechanisms where the materials are mixed under conditions of high shear until the appropriate degree of wetting, intimate contact and reaction are achieved.

During the extrusion and/or pelletizing process, the cellulosic fibers, copolymer, optional elastomeric polymers, and any optional additives are intimately contacted at high temperatures and pressures to insure that the cellulosic fiber and copolymer are wetted, mixed and extruded in a form such that the copolymer, on a microscopic basis, coats and flows into the pores, cavities, etc., of the cellulosic fibers. In many cases, the fibers are substantially oriented by the extrusion process in the extrusion direction. Such substantial orientation causes overlapping of adjacent parallel fibers and copolymer coating of the oriented fibers resulting in a material useful for manufacture of improved structural members with improved physical properties. The degree of orientation (the fraction of fibers oriented in the extrusion or machine direction) can be about 20%, in many cases about 30% above random orientation which is about 45 to 50%. The reaction between the anhydride groups in the copolymer and the hydroxyl groups in of the cellulosic fiber often "lock" this orientation in place as well as providing the blowing agent that acts to foam the composition when it exits the extruder.

In the methods of the present invention, moisture control can be an important element of the process. Depending on the equipment used and processing conditions, control of the water content of the components can be important in forming a desirable article with controlled foam characteristics. When the amount of moisture in the cellulosic fiber during the processing steps described herein is too high, it can result in the water flashing from the surface of the newly extruded article as a result of a rapid volatilization in the form of a steam bubble deep in the interior of the extruded article, which can pass from the interior through the hot thermoplastic extrudate leaving a substantial flaw. In a similar fashion, surface water can bubble and leave cracks, bubbles or other surface flaws in the extruded article.

In embodiments of the invention, the extruder is vented to release undesirable moisture from the cellulosic material and/or to release excess pressure in the extruder caused by the copolymer-cellulose reaction.

In the various embodiments of the invention, the cellulosic fiber-thermoplastic composite can be extruded by melt mixing at a temperature sufficient to flow the copolymer and extruding through an extruder die any of the cellulosic fiber-thermoplastic composite disclosed herein one or more times. Both single-pass or multiple-pass extrusion can be used in the invention.

In various embodiments of the invention, the cellulosic fiber-thermoplastic composite can be formed using a Banbury mixer, or a Brabender mixer and/or a twin-screw extruder. The cellulosic fiber-thermoplastic composite can be blended and kneaded using methods known in the art at any suitable stage in the process until the point just before production of the final product. Blending can be effected by various methods, such as using a suitable mixer such as tumbler, Henschel mixer, etc., or supplying the measured amounts of the component materials to the extruder hopper by a feeder and mixing them in the extruder. Kneading may also be accomplished by suitable known methods such as using a single- or double-screw extruder.

In many embodiments of the invention, the compounding steps will generally include an extruder. The extruder may be a single screw or a twin screw extruder. In many cases, the extruder is one that can carry out the compounding process under vacuum or pressure.

In embodiments of the invention, sufficient pressure is maintained in the extruder where the copolymer and cellulosic fibers are combined in order to prevent any water vapor, carbon dioxide or other evolved blowing agent from the reaction of the copolymer and cellulosic fiber from escaping the copolymer and cellulosic fiber mixture.

When the cellulosic fiber-thermoplastic composite composition is formed in an extruder and extruded directly to form the articles of the invention, the pressure on the copolymer and cellulosic fiber mixture is released after the mixture is discharged from the extruder and enters a die or other shaping device that causes the extruded mixture to expand to form a foamed article having a desired shape and or dimension.

In many embodiments of the invention, vacuum is applied after extruding the reacted/foamed copolymer-cellulosic composite through a die in order to maintain a desired profile while the composite is cooled below its melt temperature and/or its Tg.

In embodiments of the invention, the extrusion and shaping conditions are adjusted to provide a material that is a completely micro foamed structure or is a combination of structured foam and micro foam structures as described above.

Thus, embodiments of the present invention provide a method of making the foamed cellulosic fiber-thermoplastic composite articles directly. The method can include a) combining the copolymer and optional elastomeric polymers to form a compounded copolymer; b) combining the cellulosic fibers with the compounded copolymer to form a cellulosic compounded copolymer; and c) extruding the cellulosic compounded copolymer to form an extruded article.

In embodiments of the invention, profile extrusion techniques are used to form the article. In this embodiment, the cellulosic fiber-thermoplastic composite is added to an extruder using any of the methods described above and the material is conveyed continuously forward by a rotating screw inside a heated barrel and is softened by both friction and heat. The softened cellulosic fiber-thermoplastic composite can then be forced through a die and cooled to form the article. In some embodiments, the softened cellulosic fiber-thermoplastic composite is forced through a die and fed directly into a cool water bath where the cellulosic fiber-thermoplastic composite solidifies to form the article.

In embodiments of the invention, vacuum calibration units can be used with the profile extruder to provide a platform for sizing the cellulosic fiber-thermoplastic composite profiles, such as window frames, fencing panels, slats for window blinds and decking boards.

As indicated above, the present foamed cellulosic fiber-thermoplastic composite article can be made by forming pellets of the cellulosic fiber-thermoplastic composite and then molding or extruding the pellets to form articles. In these embodiments of the invention, a first-pass method can be used whereby the components (cellulosic fibers, copolymer, optional elastomeric polymers, and any optional additives) are gravity fed into an extruder and pellets of a homogeneous composition are formed.

In some embodiments, it is necessary to include a second pass that begins with already homogeneous pellets of relatively uniform size. Property and output rate fluctuations due to imperfect mixing are largely eliminated when the pellets are melted and re-extruded in a second pass.

In the embodiments of the invention utilizing the cellulosic fiber-thermoplastic composite in pellet form, the manufacture of the pellet can include two steps, a blending step, as described above, and a pelletizing step.

In embodiments of the invention, the copolymer and cellulosic fiber can be dry blended in appropriate proportions prior to introduction into blending equipment. The blending steps can occur in separate powder handling equipment or the copolymer fiber streams can be simultaneously introduced into the mixing station at appropriate feed ratios to ensure appropriate product composition.

In some embodiments of the invention, the cellulosic fiber is placed in a hopper, controlled by weight or by volume, to proportion fiber into the mixer. The copolymer is introduced into a resin input system. The amount of copolymer and fiber can be adjusted to ensure that the composite material contains appropriate proportions on a weight or volume basis. The fibers can be introduced into an extrusion device that can include a mixing section, a transport section and a melt section. Each section typically has a desired heat profile resulting in a useful product. The materials can be introduced into the extruder at a rate of about 100 to about 1000 pounds of material per hour and can be initially heated to a temperature that can maintain an efficient melt flow of copolymer. A multistage device can be used that profiles processing temperature to efficiently combine copolymer and fiber. The final stage of extrusion can include a head section. The head sections can contain a circular distribution (6-8" diameter) of 10 to 500 or more, in many cases 20 to 250 orifices having a cross-sectional shape leading to the production of a regular cylindrical pellet. As the material is extruded from the head it is cut with a double-ended knife blade at a rotational speed of about 100 to 400 rpm resulting in the desired pellet length.

In some embodiments of the invention, the pellets, which in some cases are partially foamed during formation, can be placed in a mold, heated to cause further reaction between the copolymer and cellulosic fiber resulting in further expansion and fusion of the expanded pellets to form a foamed mass in the shape of the mold.

In other embodiments of the invention, the pellets can be placed in an extruder as described above and extruded to form a foamed article as described herein.

The cellulosic fiber-thermoplastic composite of the invention may also be used in other forming processes, i.e., injection molded structural foam processes, injection molding, compression molding, co extrusion, and blow molding or via extrusion methods for film or sheet, and thermoforming for producing parts such as those described herein.

In embodiments of the invention, the dried cellulosic fiber is fed via wood hopper to a twin screw extruder, which heats the fiber to temperature while being transported. The copolymer is fed via a polymer hopper to single screw extruder, in which the copolymer is melted and fed to a twin screw extruder, where the molten copolymer and cellulosic fiber are mixed. A vent can optionally be included along the twin screw extruder to allow excess water vapor to be removed from the cellulosic fiber-copolymer mixture. The mixture exits the twin screw extruder through a profile die, where the mixture is generally shaped. The mixture exits the profile die and foams to fill the dimensions of a shaping section of a calibration table, which can utilize vacuum to ensure that the cellulosic fiber-copolymer mixture foams to the desired profile shape. While optionally continuing the application of vacuum a cooling section of the calibration table is immersed in a water bath, or other suitable cooling means (refrigerant, heat exchanger, etc.) where the temperature of the cellulosic fiber-copolymer mixture is brought below its melting point so that the cellular structure is maintained and the occurrence of sinks or other surface imperfections is minimized. After exiting the calibration table, the extruded foamed cellulosic fiber-copolymer mixture is pulled through a traveling cut-off saw and to a run-off table.

In particular embodiments of the invention, the equipment that can be used in the present methods can include a WT-94 WOODTRUDER® system, which can include a GP94 94 mm counter-rotating parallel twin-screw extruder (28:1 L/D) with a coupled Mark V® 75 mm single screw extruder. The feed system can include three gravimetric feeders (such as Colortronics Systems AG, Hunzenschwil, Switzerland) supplying the 75 mm single screw extruder via flood feeding and three gravimetric feeders (such as Colortronics) supplying the 94 mm twin screw extruder via starvation feeding. The side feeding of melt polymer in this system has advantages for creating an efficient foaming mechanism. First, a relatively low melt temperature and/or Tg, which is favorable for controlling foaming and cell growth, affects cell size distribution and cell density. Second, premature foaming in the middle of the extruder can be prevented, since the nucleation of foaming begins at the exit of the extrusion barrel after thermal mixing with the cellulosic fibers and the copolymer melt.

In embodiments of the invention, the melt temperature and/or Tg of the copolymer can be from about 204° C. to about 260° C. according to the particular process used. In some embodiments of the invention, the sequential barrel zone temperatures of the 75 mm single screw extruder can be set at 250° C., 240° C., 220° C., 210° C., and 205° C. respectively. Within these conditions, the copolymer melt can be fed to the 94 mm twin screw extruder with good flowability. The melt temperature and/or Tg of the copolymer fed from the single screw extruder can be from about 200° C. to about 205° C. In order to control foaming, the melt temperature is typically kept as low as possible within the ranges of temperature that assure sufficient melt flow. In some embodiments, the copolymer melt temperature can be maintained as low as 204° C. at a melt pressure of about 900 psi. Cellulosic fibers can be fed into the twin screw extruder and heated up to about 175° C. for several minutes by the hot extruder barrel and the moisture from wood flour is efficiently removed through atmospheric and vacuum venting zones.

The melt temperature of mixture of copolymer and cellulosic fiber can range from about 170° C. to about 185° C. at a melt pressure of the mixture of about 700 psi.

In embodiments of the invention, the melt pressure at the barrel end of twin screw extruder can range from about 560 psi to about 760 psi. In many embodiments, the pressure is not kept constant since it can be sensitive to the rotational cycle of the extruder screws.

In embodiments of the invention, the output rate of the extrusion can be about 152.5 lbs/hour, which can include about 90 lbs/hour of cellulosic fiber, about 55 lbs/hour of copolymer, and about 7.5 lbs/hour of lubricant. The output rate can be moderated in order to provide longer cooling times for the extrudate. When the output rate is too fast, the line speed is faster and the extrudate cooling time is shorter.

In embodiments of the invention, vacuum is applied to vent the mixture. Any excess moisture in the cellulosic fiber can result in poor surfaces with swelling and openings. In many embodiments, vacuum venting can be used to control the degree of foaming since the amount of the active blowing agent can be controlled by the amount of vacuum.

In embodiments of the invention, a profile die can be a Celuka-type die, which includes an outer shell and an inner shell. A casing die is defined by the space between the inner surface of the outer shell and the outer surface of the inner shell. A central die is defined by the space formed by inner surface of the inner shell.

In embodiments of the invention, the extruded cellulosic fiber-copolymer mixture exits the die in two streams. A first stream exits the die through a casing die to form an outer casing or shell, which is generally micro foamed as described above. A second stream exits the central die and is encased by a first stream and forms a central foam, which is structured foam in nature as described herein.

In embodiments of the present invention, while the first stream generally travels in a linear fashion with some expansion, the second stream travels in a sinusoidal fashion eventually expanding to fill the space within the outer casing or shell. In the sinusoidal aspect of the second stream, it may become thicker due to the foaming reaction. Unique to this embodiment of the invention is that, while a second stream eventually foams to fill the space within the outer casing or shell as central foam, the flow patterns and cellulose-copolymer reactions "lock" the cellulosic fibers into various orientations.

In this embodiment, the resulting encased sinusoidal foam structure includes an outer casing encompassing the outer cross-sectional surface of the extruded article and a central foam as the interior portion, which has a lower density than the outer casing. The central foam has a wave-like structure in the extrusion direction oscillating about mid-point of the article. Peak deviations and from mid-point are in contact with and fused to inner portion of the outer casing.

The cellulosic fibers in the outer casing or shell are generally oriented with the extrusion direction. On the other hand, the cellulosic fibers in the central foam have a changing orientation along the wave-like structure of the article, which follows the sinusoidal pattern. This cellulosic fiber orientation contributes to a number of the properties of the thermoplastic composite materials described herein.

In embodiments of the invention, a free foaming die can be used. As an example of these embodiments, the extruder transports cellulosic fiber along a direction and it is mixed with copolymer, which is added to the extruder via a hopper. The copolymer-cellulosic fiber mixture passes through a die into temperature controlled sizing sleeves, which include a calibration tube, and reside in a vacuum cooling tank containing water. In this embodiment, the land thickness of the die is typically constant. In this free foaming embodiment, foaming of the copolymer-cellulosic fiber mixture begins after the end of the die, or, in other words, outside of the die. The thermoplastic composite materials produced according to this method have a variable expansion ratio, are generally low density and have a good outer surface.

In embodiments of the invention, a Celuka-type foaming die can be used. In this embodiment, an extruder transports cellulosic fiber and it is mixed with copolymer, which is added to the extruder via a hopper. The copolymer-cellulosic fiber mixture passes through a sizing and cooling die, which includes a fixed torpedo in the center of the die. The foamed copolymer-cellulosic fiber mixture is cooled in a take-off section. The thermoplastic composite materials produced according to this method have a hard outer surface, medium density, a fixed expansion ratio and good strength due to the presence of dual layers.

In a particular embodiment of the invention, the Celuka-type foaming die is used in an inward foaming process. In this method the calibration unit is situated adjacent to the die and has the same dimensions as the die, which helps control foam expansion. This process provides very rapid cooling. Bubble formation is quenched in the surface of the product and a solid outer skin is produced. As a result of the dual layers, the foamed extrudate generally shows good mechanical properties. Compared with the free foaming, the Celuka-type process, provides a different cell structure and density profile.

The material produced through a free foaming die has a higher density skin at each edge (about 900 to about 1100 $kg/m^3$, in some cases about 950 to about 1050 $kg/m^3$) and the density quickly drops off at about 3 to about 20, in some cases at about 5 to about 15 percent of the overall thickness of the article to a lower density central core portion that has a lower density than the higher density skin (about 450 to about 650 $kg/m^3$, in some cases about 500 to about 600 $kg/m^3$).

The material produced through a Celuka-type die has a higher density layer at each edge (about 1200 to about 1600 $kg/m^3$, in some cases about 1300 to about 1500 $kg/m^3$) and the density quickly drops off at about 5 to about 22, in some cases at about 7 to about 18 percent of the overall thickness of the article to a lower density central core portion that has a lower density than the higher density skin (about 250 to about 450 $kg/m^3$, in some cases about 300 to about 400 $kg/m^3$). The most central portion (about 35% to about 70%, in some cases about 40% to about 60% from the edge of the article) has the lowest density in the article (about 100 to about 300 $kg/m^3$, in some cases about 150 to about 250 $kg/m^3$). In many cases, a transition zone exists between the higher density layer, lower density central core portion and most central portion.

In particular embodiments of the invention, the Celuka-type foaming die can be foaming dies manufactured by Futuresoft Technologies Inc., Manalapan, N.J. In this embodiment, there are three nozzle units located at the die wall and a center mandrel. The three melt flows from different nozzles combine at the die and the pressure drop initiates foaming. The foaming cells grow rapidly until the polymer melt is recrystallized by the effect of cooling by a calibrator unit, which may be a sizing die equipped with cold water channels. Higher density outer portions or skin layers can be formed at the edges or outer surface of the extrudate due to the relatively high cooling rate of the extrudate surface in direct contact with the die wall and calibrator units.

In an additional embodiment, an extruder transports cellulosic fiber along and it is mixed with copolymer, which is added to the extruder via a hopper. The copolymer-cellulosic fiber mixture passes through a foaming die, which includes a nozzle, which maximizes the pressure drop. As opposed to the free foaming embodiment, in this embodiment, foaming of the copolymer-cellulosic fiber mixture begins inside of the die, typically in a micro foamed fashion as described above. Foamed copolymer-cellulosic fiber mixture enters a calibrator, where it is sized and cooled for take-off. The methods according to this embodiment provide thermoplastic composite materials with a higher cell density and larger expansion ratio.

A nozzle foaming die system generally provides a microcellular foaming mechanism. The nozzle is relatively thinner than many foaming dies and is meant to keep the melt pressure as high as possible, resulting in a large pressure drop at the end of the nozzle. The system in this embodiment provides good nucleation initiation resulting in an increased cell density (number of cells per unit volume).

In embodiments of the invention, a system of water cooling tanks can be placed after the calibration units to maintain extrudate cooling until stable dimensions of the products are achieved. The system of water tanks can include stainless steel plates with thick epoxy side walls, top windows, and water circulation pipes.

In particular embodiments of the invention, the water cooling tank can be about 48 inches long, 24 inches wide and 13.5 inches deep.

It should be noted that the length of the calibration units or number of calibrator units will be varied based on the cooling rate desired. In general for wood plastic composite production, three calibration units may be needed for an efficient extrusion output rate.

In embodiments of the invention, the extrudate can be cooled in the water tank and can be introduced to a water spray tank for further cooling. At the end of the water spray tank, an air knife can be employed to remove water droplets from the extrudate surfaces so that the puller, a haul-off machine, can efficiently haul the extrudate off without significant slippage.

The hauling-off rate of extrudate at the puller can be used to control the expansion rate of the foaming extrudate and aid in providing streamlined, smooth flow extrusion.

In embodiments of the invention, the puller can be those available from Royal Machine Manufacture Ltd.

After being extruded, shaped and formed, the article can have a thickness of at least about 0.1, in some instances at least about 0.15, in other instances at least about 0.25, in some cases at least about 0.5 and in other cases at least about 1 cm and can have a thickness of up to about 35, in some instances up to about 30 cm, in other instances up to about 25 cm, in some situations up to about 20 cm, in other situations up to about 15, in some cases up to about 12 cm, and in other cases up to about 10 cm. The thickness of the article can be any value or range between any of the values recited above.

The small voids in the micro foamed material can have a diameter of at least 0.01, in some cases at least 0.1 and in other cases at least 1 µm and can be less than 50, in some cases up to 49, in other cases up to 45, in some instances up to 40, in other instances up to 35, in some situations up to 30 and in other situations up to 25 µm. The size of the small voids in the micro foamed material will vary based on the composition of the copolymer, the type of cellulose and the particular extrusion conditions employed. The size of the small voids in the micro foamed material can be any value or range between any of the values recited above.

In embodiments of the invention, the density of the micro foamed material can be at least 0.6, in some cases at least 0.64 and in other cases at least 0.68 g/cm$^3$ and can be up to 1.1, in some cases up to 1.06 and in other cases up to 1.02 g/cm$^3$. In particular aspects of the invention and depending on any additional fillers that may be used, the density of the micro foamed material can be up to 1.3 and in some cases up to 1.2 g/cm$^3$. The density of the micro foamed material will vary based on the composition of the copolymer, the type of cellulose, types of fillers and the particular extrusion conditions employed.

The density of the micro foamed material can be any value or range between any of the values recited above.

The large voids in the structured foamed material can have a diameter of at least 50, in some cases at least 55 and in other cases at least 60 µm and can be up to 2,500, in some cases up to 2,000, in other cases up to 1,500, in some instances up to 1,000, in other instances up to 500, in some situations up to 400 and in other situations up to 250 µm. The size of the large voids in the structured foamed material will vary based on the composition of the copolymer, the type of cellulose and the particular extrusion conditions employed. The size of the large voids in the structured foamed material can be any value or range between any of the values recited above.

In embodiments of the invention, the density of the structured foamed material is less than the density of the micro foamed material. In aspects of this embodiment, the structured foamed material can be at least 0.45, in some cases at least 0.50 and in other cases at least 0.55 g/cm$^3$ and can be up to 0.80, in some cases up to 0.75 and in other cases up to 0.7 g/cm$^3$. The density of the structured foamed material will vary based on the composition of the copolymer, the type of cellulose and the particular extrusion conditions employed. The density of the structured foamed material can be any value or range between any of the values recited above.

A particular advantage of the present cellulosic fiber-thermoplastic composite over prior art wood fiber and/or wood four filled polyolefins is the superior tensile and thermal properties of the present cellulosic fiber-thermoplastic composite.

In embodiments of the invention, the tensile modulus of the present cellulosic fiber-thermoplastic composite, determined according to ISO 527-2, is greater than 2,000, in some cases greater than 2,500 and in other cases greater than 3,000 MPa, depending on the particular thermoplastic and cellulosic fiber that is used.

In additional embodiments of the invention, the tensile strength, determined according to ISO 527-2, of the cellulosic fiber-thermoplastic composite can be at least about 25, in some cases at least about 30, in other cases at least about 35 and in some instances at least about 40 MPa depending on the particular thermoplastic and cellulosic fiber that is used.

In particular embodiments of the invention, the cellulosic fiber-thermoplastic composite of the invention has a tensile modulus, determined according to ISO 527-2, that is at least 1.5, in some cases at least 1.75 and in other cases at least 2 times greater than the tensile modulus of a similarly composed material containing cellulosic fiber and polypropylene. Further to this embodiment, the cellulosic fiber-thermoplastic composite of the invention has a tensile strength, determined according to ISO 527-2, that is at least 1.5, in some cases at least 1.75 and in other cases at least 2 times greater than the tensile strength of a similarly composed material containing cellulosic fiber and polypropylene.

In other embodiments of the invention, the deflection temperature under load (DTUL) at 1.82 MPa determined according to ISO-75-2, of the cellulosic fiber-thermoplastic composite is at least about 85° C.

In embodiments of the invention, the flexural properties of the present cellulosic fiber-thermoplastic composite material can be characterized by the modulus of rupture of the material. According to this embodiment, the modulus of rupture determined according to ASTM D 790, is greater than 750, in some cases greater than 900 and in other cases at least 1,000 psi, depending on the particular thermoplastic and cellulosic fiber that is used.

In embodiments of the invention, the flexural properties of the present cellulosic fiber-thermoplastic composite material can be characterized by the modulus of elasticity of the material. According to this embodiment, the modulus of elasticity determined according to ASTM D 790, is greater than 75,000; in some cases greater than 90,000 and in other cases at least 100,000 psi, depending on the particular thermoplastic and cellulosic fiber that is used.

In embodiments of the invention, the flexural properties of the present cellulosic fiber-thermoplastic composite material can be characterized by the modulus of rupture of the material. According to this embodiment, the modulus of rupture determined according to ASTM D 790, is greater than 750, in some cases greater than 900 and in other cases at least 1,000 psi, and in some cases can be up to 20,000 psi depending on the particular thermoplastic and cellulosic fiber that is used.

In embodiments of the invention, the flexural properties of the present cellulosic fiber-thermoplastic composite material can be characterized by the modulus of elasticity of the material. According to this embodiment, the modulus of elasticity determined according to ASTM D 790, is greater than 75,000; in some cases greater than 90,000 and in other cases at least 100,000 psi and in some cases can be up to 1,000,000 psi depending on the particular thermoplastic and cellulosic fiber that is used.

In embodiments of the invention, the tensile properties of the present cellulosic fiber-thermoplastic composite material can be characterized by the modulus of rupture of the material. According to this embodiment, the modulus of rupture determined according to ASTM D 638, is greater than 500, in some cases greater than 650 and in other cases at least 750 psi, and in some cases can be up to 20,000 psi depending on the particular thermoplastic and cellulosic fiber that is used.

In embodiments of the invention, the tensile properties of the present cellulosic fiber-thermoplastic composite material can be characterized by the modulus of elasticity of the material. According to this embodiment, the modulus of elasticity determined according to ASTM D 638, is greater than 100,000; in some cases greater than 125,000 and in other cases at least 150,000 psi and in some cases can be up to 1,500,000 psi depending on the particular thermoplastic and cellulosic fiber that is used.

In embodiments of the invention, the impact properties of the present cellulosic fiber-thermoplastic composite material can be characterized by the Izod impact resistance of the material. According to this embodiment, the Izod impact resistance is determined according to ASTM D 256, is less than 80, in some instances less than 60, in other instances less than 50, in some situations less than 40, in other situations less than 30, in some cases less than 25 and in other cases not more than 22 J/M and in some cases can be as low as 1 J/M depending on the particular thermoplastic and cellulosic fiber that is used.

In embodiments of the invention, the flexural properties of the micro foamed portion of the present cellulosic fiber-thermoplastic composite material are greater than that of the structured foam portion as characterized by the modulus of rupture of the material determined according to ASTM D 790. In this embodiment of the invention, the structured foam portion can have a modulus of rupture that is greater than 750, in some cases greater than 900 and in other cases at least 1,000 psi and can be up to 10,000 psi, depending on the particular thermoplastic and cellulosic fiber that is used. In this embodiment, the micro foam portion can have a modulus of rupture that is greater than 1,000, in some cases greater than 1,150 and in other cases at least 1,300 psi and can be up to 20,000 psi, depending on the particular thermoplastic and cellulosic fiber that is used.

In embodiments of the invention, the flexural properties of the micro foamed portion of the present cellulosic fiber-thermoplastic composite material are greater than that of the structured foam portion as characterized by the modulus of elasticity of the material determined according to ASTM D 790. In this embodiment of the invention, the structured foam portion can have a modulus of rupture that is greater than 75,000; in some cases greater than 90,000 and in other cases at least 100,000 psi and can be up to 700,000 psi depending on the particular thermoplastic and cellulosic fiber that is used. In this embodiment, the micro foam portion can have a modulus of elasticity that is greater than 100,000, in some cases greater than 125,000 and in other cases at least 150,000 psi and can be up to 750,000 psi, depending on the particular thermoplastic and cellulosic fiber that is used.

In embodiments of the invention, the tensile properties of the micro foamed portion of the present cellulosic fiber-thermoplastic composite material are greater than that of the structured foam portion as characterized by the modulus of rupture of the material. In this embodiment of the invention, the structured foam portion can have a modulus of rupture determined according to ASTM D 638, that is greater than 500, in some cases greater than 650 and in other cases at least 750 psi, and in some cases can be up to 10,000 psi depending on the particular thermoplastic and cellulosic fiber that is used. In this embodiment, the micro foam portion can have a modulus of rupture that is greater than 1,000, in some cases greater than 1,250 and in other cases at least 1,500 psi and can be up to 20,000 psi, depending on the particular thermoplastic and cellulosic fiber that is used.

In embodiments of the invention, the tensile properties of the micro foamed portion of the present cellulosic fiber-thermoplastic composite material are greater than that of the structured foam portion as characterized by the modulus of elasticity of the material. In this embodiment of the invention, the structured foam portion can have a modulus of elasticity determined according to ASTM D 638 that is greater than 100,000; in some cases greater than 125,000 and in other cases at least 150,000 psi and in some cases can be up to 1,500,000 psi depending on the particular thermoplastic and cellulosic fiber that is used. In this embodiment, the micro foam portion can have a modulus of elasticity that is greater than 200,000, in some cases greater than 225,000 and in other cases at least 250,000 psi and can be up to 2,000,000 psi, depending on the particular thermoplastic and cellulosic fiber that is used.

In embodiments of the invention, the Izod impact properties of the micro foamed portion of the present cellulosic fiber-thermoplastic composite material are higher than that of the structured foam portion as characterized by the Izod impact resistance of the material. In this embodiment of the invention, the structured foam portion has a lower Izod impact resistance determined according to ASTM D 256 that is less than 30, in some cases less than 25 and in other cases not more than 22 J/M and in some cases can be as low as 1 J/M depending on the particular thermoplastic and cellulosic fiber that is used. In this embodiment of the invention, the micro foam portion can have an Izod impact resistance determined according to ASTM D 256 that is less than 50, in some cases less than 40 and in other cases not more than 35 J/M and in some cases can be as low as 1 J/M depending on the particular thermoplastic and cellulosic fiber that is used.

In one embodiment of the invention, the extruded article can be a synthetic board, which can include a blend of the copolymer and elastomeric polymer, a plurality of cellulosic fibers compounded with a blend to form a cellulosic fiber-thermoplastic composite. The board has a width, a thickness, and a side. The board can be used as a decking component or any other suitable building material. For example, the board can be used as a decking board, railing, railing post, window component, door component, cladding component, siding component, and/or decking beam. In another example, the board can be used to construct any portion of homes, walkways, shelters, and/or any other desirable structure.

The width of the board can be at least about 1 cm, in some cases at least about 2 cm and in other cases at least about 4 cm and can be up to about 250 cm, in some cases up to about 244 cm, in other cases up to about 215 cm, in some instances up to about 185 cm and in other instances up to about 125 cm. Width 3 can be any value or range between any of the values recited above.

The thickness of the board can be at least 1 cm, in some cases at least about 2 cm and in other cases at least about 4 cm and can be up to about 12, in some cases up to about 11, and in other cases up to about 10 cm. The thickness of the board can be any value or range between any of the values recited above.

The side of the board can be extruded to any desired length. In embodiments of the invention, the board is extruded to a commercially useful length of the side of the board, which can be at least about 5, in some cases at least about 10, in other cases at least about 20, and in some instances at least about 25 cm long and can be up to about 1,000, in some cases up to about 625, in other cases up to about 475, and in other instances up to about 375 cm. The length of the side of the board can be any value or range between any of the values recited above.

In embodiments of the invention, the cellulosic fiber-thermoplastic composite boards can have panel-type dimensions, as a non-limiting example, about 2 to about 8 feet wide, about 6 to about 12 feet long and about 0.5 to about 4 inches thick. In this embodiment, the cellulosic fiber-thermoplastic composite panel can be attached to studs or joists to form a surface for a wall, a floor or a roof.

In aspects of the invention, the density of the cellulosic fiber-thermoplastic composite article is less than 1 g/cm$^3$ and the articles are useful in marine applications. The present articles are particularly suited for marine applications because their density is less than that of water, providing desired buoyancy as well as providing a material that is very resistant to microbial attack.

The present invention will further be described by reference to the following examples. The following examples are merely illustrative of the invention and are not intended to be limiting. Unless otherwise indicated, all percentages are by weight unless otherwise specified.

EXAMPLES

Thermally modified wood (HTW) fibers were evaluated for their reactivity towards foaming using an in-situ reactive extrusion process with styrene maleic anhydride copolymer (SMA). The evaluation was conducted to measure the expansion ratio of the extrudate through a free-foaming extrusion die. The specific gravities of the samples were measured and compared to non-foamed SMA polymer samples.

Materials

A grade of SMA (XIRAN® SE700 from Polyscope) was selected as a suitable copolymer formulation for foamability. It contains rubber impact modifier and maleic anhydride at around 10%. Thermally modified wood (HTW) fibers were used. The fibers were shavings from pine that had been thermally modified by heating to 212° C. for 3 hours and subsequently ground in a hammer mill and passed through a mesh. The lubricating additives (TPW 113) were purchased from Struktol, USA. All materials were conditioned at 80° C. for at least 3 hours before the extrusion experiments. Table 1 shows the details of the formulations.

TABLE 1

| Formulations of the samples | | | | |
|---|---|---|---|---|
| # | Name | SMA | Wood | Lub |
| 1 | SMA control | 100% | — | — |
| 2 | HTW SMA-WPC | 70% | HTW 30% | — |
| 3 | HTW SMA-WPC/L | 65% | HTW 30% | 5% |
| 4 | 30% HTW SMA-WPC | 70% | HTW 9% + Pine 21% | — |
| 5 | 50% HTW SMA-WPC | 70% | HTW 15% + Pine 15% | — |

SMA: styrene maleic anhydride copolymer
HTW: thermally modified wood fiber
Lub: lubricant
30% HTW: a mixture of thermally modified wood fiber (30%) and untreated pine (70%)
50% HTW: a mixture of thermally modified wood fiber (50%) and untreated pine (50%)

Methods

Reactive foaming extrusion. A lab-scale extrusion system (AEWC #955) was used to produce the SMA-WPC with HTW fibers. The foaming die used in this study was a cylindrical-type die with 0.36 in (9.1 mm) inside diameter. The foaming mechanism was free foaming without calibrating and enforced cooling. The extrudate was cooled down in air room temperature. The RPM of the extrusion screw was set to 40 to achieve adequate mixing of the materials. The feeding rate of the materials was constantly maintained at a fixed rate for all the experiments. The extrusion residence time for the materials was 15-20 minutes based on the screw RPM and low bulk density of the materials. The variables measured during extrusion processing were extrusion torque, output rates per unit time (120 seconds), and melt pressure at the end of the extrusion barrel for all 18 formulations. The specific gravities of all extrudate produced by extrusion were determined according to ASTM standards. Table 2 shows the extrusion parameters in detail.

TABLE 2

| Extrusion temperature profile | | | | | | |
|---|---|---|---|---|---|---|
| | Zone 1 | Zone 2 | Zone 3 | Zone 4 | Zone 5 | Die |
| Temp ° C. | 215 | 215 | 220 | 220 | 215 | 215 |

Hydroxyl number determinations. The hydroxyl number analysis on particle materials was carried out according to ASTM D 4274-11 standard. Prior to the analysis, the cellulosic materials were dried in an oven at 105° C. for overnight. Acetylation of the cellulose fibers were performed using a solution of acetic anhydride in pyridine at 98±2° C. for 2 hours. The excess reagent was hydrolyzed with water and the sample solution was titrated for acetic acid using standard sodium hydroxide solution. The same acetylation and titration procedures were carried out on a blank solution which did not contain wood particle material. The hydroxyl number (H), expressed in mg of equivalent KOH per g of sample, was calculated from the difference in titration values between the blank and the sample solutions:

$$H = 56.1(B-A)N/W$$

wherein
A: NaOH required (in ml) for titration of the sample solution
B: NaOH required (in ml) for titration of the blank solution
N: Normality of the NaOH solution
W: Oven-dry weight (in g) of the cellulosic materials
The equation is normalized with molecular weight of KOH (56.1 g/mol)

Results

Extrusion variable. Table 3 shows the variables of the extrusion during the foaming experiments. There were no significant trends in the variables. It may be noted that the HTW fibers reduce the extrusion torque, which may imply the interfacial properties between two materials may differ from that of non-thermally modified cellulosic fiber. The effect of lubricants was not clearly revealed in both samples with normal pine wood and HTW fibers.

TABLE 3

| Extrusion variables measured in the production of HTW-SMA-WPC | | | | | | |
|---|---|---|---|---|---|---|
| | Pine w/o Lub | Pine w/ Lub | HTW w/o Lub | HTW w/ Lub | HTW 30% | HTW 50% |
| Melt pressure, MPa | 2.48 | 2.76 | 1.38 | 1.31 | 1.34 | 1.45 |
| Extrusion torque, Nm | 20.0 | 20.4 | 14.7 | 14.5 | 20.0 | 21.0 |

TABLE 3-continued

Extrusion variables measured in the production of HTW-SMA-WPC

|  | Pine w/o Lub | Pine w/ Lub | HTW w/o Lub | HTW w/ Lub | HTW 30% | HTW 50% |
|---|---|---|---|---|---|---|
| Average SG (COV, %) | 0.75 (4.95) | 0.45 (21.67) | 1.00 (1.82) | 1.01 (1.90) | 0.66 (2.23) | 0.69 (5.14) |

SG: Specific gravity
Pine w/o Lub: SMA-WPC sample made of normal pine wood fiber without lubricant
Pine w/ Lub: SMA-WPC sample made of normal pine wood fiber with 5% lubricant
HTW w/o Lub: SMA-WPC sample made of thermally modified wood fiber (HTW) without lubricant
HTW w/ Lub: SMA-WPC sample made of thermally modified wood fiber (HTW) with lubricant
30% HTW: SMA-WPC samples made of a mixture of thermally modified wood fiber (30%) and untreated pine (70%) was used for the 30% wood part
30% HTW: SMA-WPC samples made of a mixture of thermally modified wood fiber (50%) and untreated pine (50%) was used for the 30% wood part
COV: coefficient of variation Specific gravity. There was no significant difference in the specific gravity among the control samples and HTW-SMA-WPC samples with or without lubricants. However, the samples with mixtures of HTW and Pine wood showed an expansion with larger diameters. The foamability of the HTW fibers might be restricted by a lack of hydroxyl functionality or a poor accessibility to hydroxyls because of rough surface topology resulting from the thermal modification treatments.

Hydroxyl numbers. The hydroxyl number analysis on two wood flours (untreated and thermally modified) was carried out according to ASTM D 4274-11 standard. Prior to the analysis, the two samples were dried in an oven at 105° C. for overnight. The hydroxyl numbers obtained for the two samples are shown in the table 4. The HTW fibers showed a 20% reduction of hydroxyl numbers compared to the pine. Hydroxyl numbers of pure cellulose fibers and starch are provided for comparison purposes.

TABLE 4

Hydroxyl numbers

|  | Pine | HTW | MCC | NFC | Starch |
|---|---|---|---|---|---|
| Hydroxyl numbers (mg/g) | 233 | 187 | 303 | 410 | 896 |
| Percentile comparison | 100% | 80% | 130% | 176% | 384% |

HTW: thermally modified wood
MCC: microcrystalline cellulose
NFC: nanofibrillated cellulose Conclusions An evaluation was performed for the foamability of thermally modified wood (HTW) fibers by determining hydroxyl numbers and specific gravity of the composite samples filled with HTW fibers. The results showed that the foamability of HTW fibers in SMA-WPC was reduced compared to normal wood by the lack of hydroxyl groups available on the fiber surfaces.

Impact of Thermally Modified Fibre and Combination with Normal Pine Fibre on Extrusion Torque and Melt Flow Pressures The effect of thermally modified wood fiber (HTW) on the foamability of samples of HTW-SMA-WPC samples and parameters in the extrusion process were evaluated. The following results were obtained:

TABLE 5

| Sample | Specific gravity, Nm | Torque, Nm | Melt pressure, MPa |
|---|---|---|---|
| SMA-WPC w 30% Pine | 0.75 | 20.0 | 2.48 |
| SMA-WPC w 30% HTW | 1.02 | 14.7 | 2.48 |
| SMA | 1.05 | 28.1 | 2.56 |
| SMA-WPC w 20% HTW + 10% Pine | 0.86 | 23.7 | 1.90 |
| SMA-WPC w 15% HTW + 15% Pine | 0.88 | 24.9 | 1.96 |

TABLE 6

| Sample | Specific gravity, Nm | Torque, Nm | Melt pressure, MPa |
|---|---|---|---|
| SMA | 1.05 | 28.1 | 2.56 |
| SMA-WPC w 20% HTW + 10% Pine | 0.86 | 23.7 | 1.90 |
| SMA-WPC w 15% HTW + 15% Pine | 0.88 | 24.9 | 1.96 |
| SMA-WPC w 30% HTW + 10% Pine | 0.81 | 27.0 | 2.24 |
| SMA-WPC w 20% HTW + 20% Pine | 0.91 | 27.7 | 2.38 |
| SMA-WPC w 40% HTW + 10% Pine | 0.83 | 34.3 | 2.78 |
| SMA-WPC w 25% HTW + 25% Pine | 0.81 | 32.1 | 2.65 |

The results obtained illustrate the following:

The thermally modified fibers reduced the extrusion torque and melt pressures, compared to the regular Pine wood. As a result, it would be expected that the need for lubrication would be reduced which would be beneficial. In addition, the lower torque means that the energy consumption during extrusion is reduced.

The thermally modified fibers had less impact on the decrease of the density of the composite samples, compared to the regular Pine wood, because of the reduction of foaming obtained by inclusion of thermally modified fibers.

When the thermally modified fibers were used in combination with small amounts of Pine wood in the SMA-WPC (wood product composite) extrusion, the density decrease was impacted because of the more active foaming nature of the Pine.

The results indicate that it is possible to regulate the amount of foaming, melt flow and torque through introduction of only a small percentage of pine (as low as 5%) into the formulation and thus there is potential to optimize density, strength and levels of foaming through modifying the ratio of thermally modified fibre to pine. Because of the fact that the thermally modified fibre has a lower amount of available hydroxyl groups less reaction occurs with the grafted SMA and thus less foaming agent is created, however by introduction of low levels of pine this can be increased but still the structural benefits of the thermally modified fiber can be achieved. These results indicate the possibility to increase the overall share of organic fibres in the composition closer to 40-50% without having uncontrollable levels of foaming which would make processing and accurate shape formation very difficult.

Comparison of Foaming Rate of Thermally Modified Fibers and Pine Fibers when Mixed with SMA Co-Polymer The following samples were prepared:

Sample 1: 70% SMA (SE700), 30% Pine

Sample 2: 80% SMA (SE700), 20% HTW

Sample 3: 70% SMA (SE700), 30% HTW

Sample 4: 60% SMA (SE700), 40% HTW

The specifications of the lab-extrusion system was as follows:

Manufacturer: Brabender

Screw type: co-rotating parallel twin screw

Screw size: 28 mm

Feeding system: twin volumetric feeders with an option of multi-side feeding

Extrusion torque and melt pressure was determined. The values are averaged from the whole extrusion time since the melt pressure and extrusion torque were not constant during the extrusion, which is very common. The changes of the torque and melt pressure showed a trend of increase when the loading levels of thermally modified fibers increased:

TABLE 7

Extrusion torque and melt pressure

|  | SMA only | Sample 1 | Sample 2 | Sample 3 | Sample 4 |
|---|---|---|---|---|---|
| Torque, Nm | 20 | 22 | 16 | 20 | 25 |
| Melt pressure, MPa | 1.71 | 1.90 | 1.43 | 1.72 | 2.48 |

As shown above, even the use of high amounts of thermally modified fibers does not have a significant impact on the torque, thus maintaining similar energy consumption as in extrusion of the base polymer.

The four extrudate samples described above were measured for their expansion dimensions (weight/length by unit time and diameter of the extrudate samples) and specific gravity (calculated according to ASTM D2395):

TABLE 8

Density measurements and the samples' expansion

| Sample | Unit length, mm | Avg diameter, mm | Unit volume, mm³ | Unit weight, g |
|---|---|---|---|---|
| 1 | 198.89 | 11.505 | 20.66 | 14.680 |
| 2 | 210.20 | 10.245 | 17.32 | 17.346 |
| 3 | 266.84 | 11.041 | 25.53 | 18.141 |
| 4 | 241.46 | 9.915 | 18.63 | 15.981 |

The results illustrate that by using thermally modified fibers the volume by weight extruded is increased compared to normal pine. This is as a result of the finer particle size and the compaction behavior of the thermally modified fibers. Using the thermally modified fibers increases the throughput at a given rate and this is indicated by the longer unit length, increased unit weight but limited difference in average diameter, which also indicates reduced foaming compared to normal pine.

All four samples were also measured for their melt flow index (MFI). The samples were heated at 240° C. for 10 minutes and pressed under 2.16 kg weight. The extrudate was collected for weighing by unit time (10 minutes). The results are listed in the table below. The MFI of the composite samples with regular Pine and thermally modified fibers are much lower than the control (SMA, SE700). At the higher contents of thermally modified fibers (30% and 40%), the MFI does not change significantly.

TABLE 9

Melt flow index of the samples

| Sample | Average MFI, g/10 min | Coefficient of variance, % |
|---|---|---|
| 1 | 0.1803 | 12.2 |
| 2 | 0.2023 | 12.1 |
| 3 | 0.1770 | 7.4 |
| 4 | 0.1930 | 15.1 |
| Control (SMA) | 0.2556 | 7.9 |

Mechanical Properties of Non-Foamed HTW SMA-WPC

Tensile specimens of non-foamed HTW SMA-WPC were manufactured and tested for its tensile modulus and strength. Four (4) samples were fabricated by an injection molding using granulates of foamed rods which were produced by a reactive extrusion in lab scale. The injection was performed at 213° C. (barrel) and 217° C. (nozzle). The pressure was 69 MPa. The results may imply the potential function of HTW as additives for stiffness enhancer. Tables 10 and 11 show the effects of HTW fibers and polymer matrices on the properties.

TABLE 10

Tensile properties of SMA-WPC samples with thermally modified wood fibers

| Tensile properties | SMA SE700 | HTW SMA-WPC w/o Lub | HTW SMA-WPC w/Lub | HTW SMA-WPC w/30% | HTW SMA-WPC w/50% |
|---|---|---|---|---|---|
| Modulus, GPa | 2.1 | 3.3 | 3.4 | 3.5 | 3.7 |
| Strength, MPa | 35 | 40 | 41 | 39 | 42 |

TABLE 11

Tensile property comparison of WPC samples with HTW fibers and regular wood flours in different polymeric matrices [WPC-HDPE: high density polyethylene based wood plastic composite, WPC-PP: polypropylene based wood plastic composite, WPC-PS: polystyrene based wood plastic composite. All samples contains 30% wood flour by weight. Cited from Wolcott, Michael and Englund, Karl. A Technology Review of WPCs. 33rd International Particleboard/composite Materials Symposium]

| Sample | Modulus, GPa | Strength, MPa |
|---|---|---|
| SMA SE700 | 2.1 | 35 |
| HTW SMA-WPC w/Lub | 3.4 | 41 |
| HTW SMA-WPC w/30% HTW | 3.5 | 39 |
| HTW SMA-WPC w/50% HTW | 3.7 | 42 |
| WPC-HDPE | 1.6 | 20 |
| WPC-PP | 2.0 |  |
| WPC-PS | 2.4 | 34 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method of making a foamed cellulosic fiber-thermoplastic composite article comprising:
   A) providing a copolymer composition that includes:
      i) at least about 20 wt. % of a copolymer formed by polymerizing a mixture comprising:

a) about 51% to about 99.9% by weight of one or more primary monomers, and
b) about 0.1% to about 49% by weight of one or more anhydride containing monomers;
B) combining about 30% to about 99.9% by weight of the copolymer composition with about 0.01% to about 70% by weight of one or more cellulosic fibers based on the weight of the combination;
C) applying an amount of heat, mixing energy and pressure sufficient to:
  i) mix the copolymer composition and the cellulosic fibers;
  ii) react anhydride groups in the copolymer with hydroxyl groups in the cellulosic fibers; and
  iii) produce a blowing agent as a byproduct of the reaction in ii) and provide a foamable mixture of the copolymer composition and the cellulosic fibers; and
D) forming the foamed article by placing the foamable mixture in a molding or extruding operation;
wherein the foamed article has a structured foam central portion and micro foamed outer portion that surrounds the structured foam portion and has a higher density than the structured foam central portion;
wherein the micro foamed outer portion comprises from about 5 to about 22 percent of an overall thickness of the foamed article;
wherein at least 10% of the cellulosic fibers of B) were thermally modified to reduce an amount of available hydroxyl groups prior to being combined with the copolymer composition and wherein at least 5% of the cellulosic fibers of B) were not thermally modified, and,
wherein the thermal modification of the cellulosic fibers is performed by heating at a temperature of from 160° C. to 250° C. at atmospheric pressure or at a temperature of from 120° C. to 230° C. at a pressure higher than atmospheric pressure.

2. A method according to claim 1, wherein the cellulosic fibers have been thermally modified by heat treatment at a temperature from 160 to 250° C. at atmospheric pressure.

3. A method according to claim 1, wherein at least 30% of the cellulosic fibers have been thermally modified prior to being combined with the copolymer composition.

4. A method according to claim 3, wherein at least 50% of the cellulosic fibers have been thermally modified prior to being combined with the copolymer composition.

5. A method according to claim 3, wherein the thermally modified cellulosic fibers are mixed with the non-thermally modified cellulosic fibers prior to being combined with the copolymer composition.

6. The method according to claim 1, wherein the foamed article has a density of not more than 1.3 g/cm³.

7. The method according to claim 1, wherein the primary monomers are selected from the group consisting of styrenic monomers and olefinic monomers and combinations thereof.

8. The method according to claim 7, wherein the styrenic monomers are selected from the group consisting of styrene, p-methyl styrene, α-methyl styrene, tertiary butyl styrene, dimethyl styrene, nuclear brominated or chlorinated derivatives thereof and combinations thereof and the olefinic monomers are selected from the group consisting of ethylene; propylene, 1-butene, 1-pentene, 1-hexene, 1-heptene, 1-octene, 1-nonene, 1-decene, 1-dodecene; 2-butene; 2-pentene; 2-hexene; 2-octene; and combinations thereof.

9. The method according to claim 1, wherein the anhydride containing monomers include one or more monomers according to Formulas I and II: wherein $R^1$, $R^2$ and $R^4$ are each independently H or a $C_1$-$C_8$ linear, branched or cyclic alkyl or alkenyl radical and $R^3$ is a $C_1$-$C_8$ linear or branched alkyl group—

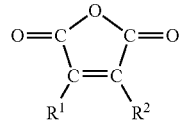

I

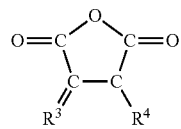

II

10. The method according to claim 1, wherein the other monomers are one or more selected from the group consisting of divinylbenzene; conjugated dienes; $C_1$-$C_{12}$ linear, branched or cyclic alkyl mono- or di-esters of maleic acid, fumaric acid and itaconic acid; $C_1$-$C_{12}$ linear, branched or cyclic alkyl esters of acrylic acid, $C_1$-$C_{12}$ linear, branched or cyclic alkyl esters of methacrylic acid; acrylonitrile; methacrylonitrile; and combinations thereof.

11. The method according to claim 1, wherein the weight average molecular weight of the copolymer is from about 20,000 to about 1,000,000.

12. The method according to claim 1, wherein the elastomeric polymers are selected from the group consisting of homopolymers of butadiene or isoprene; random, block, AB diblock, or ABA triblock copolymers of a conjugated diene with a styrenic monomer and/or acrylonitrile; ABS; copolymers of $C_1$-$C_{12}$ linear, branched or cyclic olefins and $C_1$-$C_{12}$ linear, branched or cyclic alkyl esters of (meth) acrylic acid, diblock and triblock copolymers of styrene-butadiene, styrene-butadiene-styrene, styrene-isoprene, styrene-isoprene-styrene, partially hydrogenated styrene-isoprene-styrene and combinations thereof.

13. The method according to claim 1, wherein the cellulosic fibers have a diameter of at least 0.1 μm.

14. The method according to claim 1, wherein the foamable mixture comprises one or more additives selected from the group consisting of heat stabilizers, light stabilizers, plasticizers, dyes, pigments; anti-blocking agents; slip agents; lubricants; coloring agents; antioxidants; ultraviolet light absorbers; fillers; anti-static agents; impact modifiers, antimicrobial agents, and combinations thereof.

15. The method according to claim 1, wherein the copolymer and elastomeric copolymer are combined by melt blending.

16. The method according to claim 1, wherein the copolymer composition and cellulosic fibers are combined by melt blending.

17. The method according to claim 1, wherein the copolymer, cellulosic fiber and optional elastomeric polymers and/or optional other additives are dry blended and added to an extruder.

18. The method according to claim 1, wherein the copolymer and optionally the elastomeric polymer are added to a first extruder and then combined with the cellulosic fiber and optional other additives in a second extruder.

19. The method according to claim 1, wherein the combination of the copolymer composition and cellulosic fibers is extruded by melt mixing at a temperature sufficient for the copolymer to flow and extruding the combination through an extruder die one or more times.

20. The method according to claim 1, wherein the extruding operation comprises one or more single-screw extruders and/or twin-screw extruders.

21. The method according to claim 20, wherein the extruding operation comprises maintaining sufficient pressure in one or more extruders to prevent the blowing agent from escaping from the foamable mixture.

22. The method according to claim 1, wherein the byproduct blowing agent is selected from the group consisting of water vapor, carbon dioxide or combinations thereof.

23. The method according to claim 1, wherein the extruding operation comprises discharging the foamable mixture from an extruder into a die or other shaping device that causes the foamable mixture to expand to form a foamed article having a desired shape and or dimension.

24. The method according to claim 1, wherein the molding operation comprises:
  A) feeding the foamable mixture into an extruder to form pellets;
  B) placing the pellets in a mold corresponding to the desired shape of the foamed article; and
  C) heating the mold and pellets to cause the pellets to expand and fuse to form the foamed article.

25. The method according to claim 1, wherein the foamed article comprises a micro foamed portion having a density of from about 0.6 to about 1.3 g/cm$^3$.

26. The method according to claim 1, wherein the foamed article comprises a structured foamed portion having a density of from about 0.45 to about 0.80 g/cm$^3$.

27. The method according to claim 1, wherein the micro foamed portion has a density of from about 0.6 to about 1.3 g/cm$^3$ and the structured foamed portion has a density of from about 0.45 to about 0.80 g/cm$^3$.

28. The method according to claim 1, wherein the cellulosic fiber-thermoplastic composite is compounded or otherwise blended with one or more other polymers to form a cellulosic fiber-thermoplastic composite blend.

29. The method according to claim 1, wherein about 30% to about 99.9% by weight of the copolymer composition is combined with about 25% to about 70% by weight of one or more cellulosic fibers that based on the weight of the combination; characterized in that the cellulosic fiber has been thermally modified prior to being combined with the copolymer composition.

30. The method according to claim 1, wherein the thermal modification of the cellulosic fiber is performed by heating at a temperature of from 180° C. to 250° C. at atmospheric pressure or at a temperature of from 120° C. to 230° C. at a pressure higher than atmospheric pressure.

31. The method according to claim 1, wherein the thermal modification is performed by heating at a temperature of from 200° C. to 250° C. at atmospheric pressure.

32. The method according to claim 1, wherein the thermal modification takes place in an essentially oxygen-free environment.

33. The method according to claim 1, wherein the copolymer formed by polymerizing a mixture further comprises
  c) about 1% to about 25% by weight of one or more other polymerizable monomers.

34. The method according to claim 1, wherein the copolymer composition further includes
  ii) about 0.1% to about 30% by weight of one or more elastomeric polymers based on the weight of the copolymer.

35. The method according to claim 1, wherein the cellulosic fibers have been thermally modified by heat treatment at a temperature from 200 to 230° C. at atmospheric pressure.

36. The method according to claim 1, wherein the cellulosic fibers have been thermally modified by heat treatment at a temperature from 120° C. to 230° C. at elevated pressure.

* * * * *